(12) United States Patent
Mountainland et al.

(10) Patent No.: US 11,732,203 B2
(45) Date of Patent: *Aug. 22, 2023

(54) EBULLATED BED REACTOR UPGRADED TO PRODUCE SEDIMENT THAT CAUSES LESS EQUIPMENT FOULING

(71) Applicant: HYDROCARBON TECHNOLOGY & INNOVATION, LLC, Lawrenceville, NJ (US)

(72) Inventors: David M. Mountainland, Princeton, NJ (US); Brett M. Silverman, Salt Lake City, UT (US); Michael A. Rueter, Plymouth Meeting, PA (US); Lee Smith, Pleasant Grove, UT (US)

(73) Assignee: HYDROCARBON TECHNOLOGY & INNOVATION, LLC, Lawrenceville, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/403,257

(22) Filed: Aug. 16, 2021

(65) Prior Publication Data

US 2021/0371762 A1 Dec. 2, 2021

Related U.S. Application Data

(63) Continuation-in-part of application No. 15/908,111, filed on Feb. 28, 2018, now Pat. No. 11,118,119.

(Continued)

(51) Int. Cl.
*C10G 75/00* (2006.01)
*B01J 35/02* (2006.01)
(Continued)

(52) U.S. Cl.
CPC ............... *C10G 75/00* (2013.01); *B01J 8/26* (2013.01); *B01J 27/04* (2013.01); *B01J 27/051* (2013.01);
(Continued)

(58) Field of Classification Search
CPC ........ C10G 47/02; C10G 47/36; C10G 47/30; C10G 75/00; C10G 2300/1044;
(Continued)

(56) References Cited

U.S. PATENT DOCUMENTS 2,850,552 A 9/1958 Ogle
3,019,180 A 1/1962 Schreiner et al.
(Continued)

FOREIGN PATENT DOCUMENTS

CA 2004882 A1 6/1991
CA 1295112 C 2/1992
(Continued)

OTHER PUBLICATIONS

"HYVAHL, Significantly Improved RFCC Performance or Low Sulfur Fuel Oils Via Residue Hydrotreatment", Axens IPF Group Technologies, pp. 1,2 (Jan. 2003).
(Continued)

*Primary Examiner* — Prem C Singh
*Assistant Examiner* — Brandi M Doyle
(74) *Attorney, Agent, or Firm* — Workman Nydegger

(57) ABSTRACT

An ebullated bed hydroprocessing system is upgraded and operated at modified conditions using a dual catalyst system to produce less fouling sediment. The less fouling sediment produced by the upgraded ebullated bed reactor reduces the rate of equipment fouling at any given sediment production rate and/or concentration compared to the sediment produced by the ebullated bed reactor prior to upgrading. In some cases, sediment production rate and/or concentration are maintained or increased, after upgrading the ebullated bed reactor, while equipment fouling is reduced. In other cases, sediment production rate and/or concentration are increased, after upgrading the ebullated bed reactor, without increasing equipment fouling. In some cases, sediment pro- (Continued)

duction rate and/or concentration are decreased by a given percentage, after upgrading the ebullated bed reactor, and the rate of equipment fouling is decreased by a substantially greater percentage.

25 Claims, 11 Drawing Sheets

Related U.S. Application Data

(60) Provisional application No. 62/466,011, filed on Mar. 2, 2017.

(51) Int. Cl.
    *B01J 27/04*     (2006.01)
    *B01J 35/00*     (2006.01)
    *B01J 8/26*     (2006.01)
    *B01J 37/04*     (2006.01)
    *B01J 27/051*     (2006.01)
    *C10G 65/02*     (2006.01)

(52) U.S. Cl.
    CPC .......... *B01J 35/0006* (2013.01); *B01J 35/023* (2013.01); *B01J 37/04* (2013.01); *C10G 65/02* (2013.01); *B01J 2208/00707* (2013.01); *B01J 2208/025* (2013.01); *C10G 2300/1077* (2013.01); *C10G 2300/208* (2013.01); *C10G 2300/4006* (2013.01); *C10G 2300/4018* (2013.01); *C10G 2300/4075* (2013.01); *C10G 2300/708* (2013.01)

(58) Field of Classification Search
    CPC ...... C10G 2300/107; C10G 2300/1077; C10G 2300/208; C10G 2300/70; B01J 8/24; B01J 8/1809; B01J 27/04; B01J 35/0006; B01J 35/023; B01J 37/04; B01J 37/08; B01J 2219/00247
    See application file for complete search history.

(56) References Cited

U.S. PATENT DOCUMENTS

| | | |
|---|---|---|
| 3,161,585 A | 12/1964 | Gleim et al. |
| 3,254,017 A | 5/1966 | Arey et al. |
| 3,267,021 A | 8/1966 | Gould |
| 3,297,563 A | 1/1967 | Doumani |
| 3,349,713 A | 10/1967 | Fassbender |
| 3,362,972 A | 1/1968 | Wallington |
| 3,578,690 A | 5/1971 | Becker |
| 3,595,891 A | 7/1971 | Cavitt |
| 3,622,497 A | 11/1971 | Gleim |
| 3,622,498 A | 11/1971 | Stolfa et al. |
| 3,694,351 A | 9/1972 | White |
| 3,694,352 A | 9/1972 | Gleim |
| 3,816,020 A | 6/1974 | Ogles |
| 3,870,623 A | 3/1975 | Johnson et al. |
| 3,892,389 A | 7/1975 | Contastin |
| 3,915,842 A | 10/1975 | Gatsis |
| 3,919,074 A | 11/1975 | Gatsis |
| 3,953,362 A | 4/1976 | Lines et al. |
| 3,983,028 A | 9/1976 | McCollum et al. |
| 3,992,285 A | 11/1976 | Hutchings |
| 4,022,681 A | 5/1977 | Sheng et al. |
| 4,066,530 A | 1/1978 | Aldridge et al. |
| 4,066,561 A | 1/1978 | Nnadi |
| 4,067,798 A | 1/1978 | Hauschildt et al. |
| 4,067,799 A | 1/1978 | Bearden et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden et al. |
| 4,148,750 A | 4/1979 | Pine |
| 4,151,070 A | 4/1979 | Allan et al. |
| 4,169,038 A | 9/1979 | Metrailer et al. |
| 4,178,227 A | 12/1979 | Aldridge et al. |
| 4,181,601 A | 1/1980 | Sze |
| 4,191,636 A | 3/1980 | Ando et al. |
| 4,192,735 A | 3/1980 | Aldridge et al. |
| 4,196,072 A | 4/1980 | Aldridge et al. |
| 4,226,742 A | 10/1980 | Bearden et al. |
| 4,252,634 A | 2/1981 | Khulbe et al. |
| 4,271,323 A | 6/1981 | Durand et al. |
| 4,285,804 A | 8/1981 | Jacquin et al. |
| 4,298,454 A | 11/1981 | Aldridge et al. |
| 4,305,808 A | 12/1981 | Bowes et al. |
| 4,313,818 A | 2/1982 | Aldridge et al. |
| 4,325,802 A | 4/1982 | Porter et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |
| 4,422,927 A | 12/1983 | Kowalczyk et al. |
| 4,422,960 A | 12/1983 | Shiroto et al. |
| 4,427,532 A | 1/1984 | Varghese |
| 4,430,207 A | 2/1984 | Kukes |
| 4,435,314 A | 3/1984 | Van et al. |
| 4,452,265 A | 6/1984 | Loennebring |
| 4,454,023 A | 6/1984 | Lutz |
| 4,455,218 A | 6/1984 | Dymock et al. |
| 4,457,831 A | 7/1984 | Gendler |
| 4,465,630 A | 8/1984 | Akashi et al. |
| 4,467,049 A | 8/1984 | Yoshii et al. |
| 4,485,004 A | 11/1984 | Fisher et al. |
| 4,485,008 A | 11/1984 | Maa et al. |
| 4,508,616 A | 4/1985 | Larrauri et al. |
| 4,513,098 A | 4/1985 | Tsao |
| 4,525,267 A | 6/1985 | Inooka |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A | 1/1986 | Bearden et al. |
| 4,568,657 A | 2/1986 | Sepulveda et al. |
| 4,578,181 A | 3/1986 | Derouane et al. |
| 4,579,646 A | 4/1986 | Grosboll et al. |
| 4,581,344 A | 4/1986 | Ledoux et al. |
| 4,582,432 A | 4/1986 | Mehta |
| 4,585,545 A | 4/1986 | Yancey et al. |
| 4,590,172 A | 5/1986 | Isaacs |
| 4,592,827 A | 6/1986 | Galiasso et al. |
| 4,592,830 A | 6/1986 | Howell et al. |
| 4,606,809 A | 8/1986 | Garg |
| 4,608,152 A | 8/1986 | Howell et al. |
| 4,613,427 A | 9/1986 | Sepulveda et al. |
| 4,614,726 A | 9/1986 | Walters et al. |
| 4,626,340 A | 12/1986 | Galiasso et al. |
| 4,633,001 A | 12/1986 | Cells |
| 4,652,311 A | 3/1987 | Gulla et al. |
| 4,652,647 A | 3/1987 | Schlosberg et al. |
| 4,674,885 A | 6/1987 | Erwin et al. |
| 4,676,886 A | 6/1987 | Rahbe et al. |
| 4,678,557 A | 7/1987 | Rodriguez et al. |
| 4,693,991 A | 9/1987 | Bjornson et al. |
| 4,695,369 A | 9/1987 | Garg et al. |
| 4,701,435 A | 10/1987 | Garcia et al. |
| 4,707,245 A | 11/1987 | Baldasarri et al. |
| 4,707,246 A | 11/1987 | Gardner et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag et al. |
| 4,734,186 A | 3/1988 | Parrott et al. |
| 4,740,295 A | 4/1988 | Bearden et al. |
| 4,746,419 A | 5/1988 | Peck et al. |
| 4,762,607 A | 8/1988 | Aldridge et al. |
| 4,762,812 A | 8/1988 | Lopez et al. |

(56) References Cited

U.S. PATENT DOCUMENTS

| | | |
|---|---|---|
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,378 A | 9/1988 | Miyauchi et al. |
| 4,772,387 A | 9/1988 | Simoni |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,859,309 A | 8/1989 | De Vries et al. |
| 4,863,887 A | 9/1989 | Ohtake et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,039,392 A | 8/1991 | Bearden et al. |
| 5,055,174 A | 10/1991 | Howell et al. |
| 5,080,777 A | 1/1992 | Aegerter et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Galiasso et al. |
| 5,281,328 A | 1/1994 | Degnan et al. |
| 5,320,500 A | 6/1994 | Cholet |
| 5,332,489 A | 7/1994 | Veluswamy |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson et al. |
| 5,972,202 A | 10/1999 | Benham et al. |
| 6,004,453 A | 12/1999 | Benham et al. |
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood et al. |
| 6,139,723 A | 10/2000 | Pelrine et al. |
| 6,190,542 B1 | 2/2001 | Comolli et al. |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,309,537 B1 | 10/2001 | Harle et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Boensel et al. |
| 6,550,960 B2 | 4/2003 | Catalfamo et al. |
| 6,596,155 B1 | 7/2003 | Gates et al. |
| 6,660,157 B2 | 12/2003 | Que et al. |
| 6,686,308 B2 | 2/2004 | Mao et al. |
| 6,698,197 B1 | 3/2004 | Peterson |
| 6,698,917 B2 | 3/2004 | Etchells et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 | 10/2007 | Liu et al. |
| 7,449,103 B2 | 11/2008 | Lott et al. |
| 7,517,446 B2 | 4/2009 | Lott et al. |
| 7,578,928 B2 | 8/2009 | Lott et al. |
| 7,670,984 B2 | 3/2010 | Wu et al. |
| 7,815,870 B2 | 10/2010 | Lott et al. |
| 7,842,635 B2 | 11/2010 | Zhou et al. |
| 7,951,745 B2 | 5/2011 | Zhou et al. |
| 8,034,232 B2 | 10/2011 | Lott et al. |
| 8,142,645 B2 | 3/2012 | Zhou et al. |
| 8,303,082 B2 | 11/2012 | Menzel et al. |
| 8,303,802 B2 | 11/2012 | Lott et al. |
| 8,309,041 B2 | 11/2012 | Lott et al. |
| 8,431,016 B2 | 4/2013 | Lott et al. |
| 8,435,400 B2 | 5/2013 | Kou et al. |
| 8,440,071 B2 | 5/2013 | Lott et al. |
| 8,445,399 B2 | 5/2013 | Wu et al. |
| 8,557,105 B2 | 10/2013 | Lott et al. |
| 8,673,130 B2 | 3/2014 | Lott et al. |
| 9,605,215 B2 | 3/2017 | Lott et al. |
| 9,644,157 B2 | 5/2017 | Harris et al. |
| 2002/0125172 A1 | 9/2002 | Que et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1* | 11/2005 | Lott ............... C10G 45/16 208/213 |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier et al. |
| 2006/0079396 A1 | 4/2006 | Saito |
| 2006/0175229 A1 | 8/2006 | Montanari et al. |
| 2006/0201854 A1 | 9/2006 | Lott |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |

(56) References Cited

U.S. PATENT DOCUMENTS

| | | |
|---|---|---|
| 2007/0175797 A1 | 8/2007 | Iki et al. |
| 2007/0209965 A1 | 9/2007 | Duddy et al. |
| 2008/0107881 A1 | 5/2008 | Nakashiba et al. |
| 2009/0107881 A1 | 4/2009 | Lott et al. |
| 2009/0152165 A1 | 6/2009 | Etter |
| 2009/0159505 A1 | 6/2009 | Da et al. |
| 2009/0173666 A1 | 7/2009 | Zhou et al. |
| 2009/0308792 A1 | 12/2009 | Wu et al. |
| 2009/0310435 A1 | 12/2009 | Lott |
| 2010/0065472 A1 | 3/2010 | Chabot |
| 2010/0122931 A1 | 5/2010 | Zimmerman et al. |
| 2010/0294701 A1 | 11/2010 | Lott et al. |
| 2011/0017637 A1 | 1/2011 | Reynolds et al. |
| 2011/0017641 A1 | 1/2011 | Gupta et al. |
| 2011/0226667 A1 | 9/2011 | Lott et al. |
| 2012/0152805 A1 | 6/2012 | Chabot et al. |
| 2013/0068658 A1 | 3/2013 | Lott et al. |
| 2013/0068858 A1 | 3/2013 | Nuzzo et al. |
| 2013/0075304 A1 | 3/2013 | Chang |
| 2013/0228494 A1 | 9/2013 | Lott et al. |
| 2013/0233765 A1 | 9/2013 | Lott et al. |
| 2014/0027344 A1 | 1/2014 | Harris et al. |
| 2014/0093433 A1 | 4/2014 | Lott et al. |
| 2014/0291203 A1 | 10/2014 | Molinari et al. |
| 2015/0361360 A1 | 12/2015 | Harris et al. |
| 2017/0066978 A1 | 3/2017 | Lott et al. |
| 2017/0081599 A1 | 3/2017 | Mountainland et al. |
| 2017/0081600 A1 | 3/2017 | Mountainland et al. |

FOREIGN PATENT DOCUMENTS

| | | |
|---|---|---|
| CA | 2088402 A1 | 7/1994 |
| CA | 2579528 A1 | 9/2007 |
| CN | 1219570 | 6/1999 |
| CN | 1295112 A | 5/2001 |
| CN | 1448482 A | 10/2003 |
| CN | 2579528 Y | 10/2003 |
| CN | 1933766 A | 3/2007 |
| CN | 1950484 A | 4/2007 |
| CN | 1966618 A | 5/2007 |
| CN | 101015440 A | 8/2007 |
| CN | 202960636 U | 6/2013 |
| CN | 103228355 A | 7/2013 |
| CN | 104349804 A | 2/2015 |
| CN | 104560158 A | 4/2015 |
| CN | 105008494 A | 10/2015 |
| CN | 105518109 A | 4/2016 |
| CN | 106535954 A | 3/2017 |
| CN | 108531215 A | 9/2018 |
| CN | 108603128 A | 9/2018 |
| CN | 108699451 A | 10/2018 |
| DE | 2324441 A1 | 12/1973 |
| DE | 2315114 A1 | 10/1974 |
| DE | 2421934 A1 | 11/1974 |
| EA | 201590288 A1 | 6/2015 |
| EP | 0199399 A2 | 10/1986 |
| EP | 0546686 A1 | 6/1993 |
| EP | 0559399 A1 | 9/1993 |
| EP | 0732389 A2 | 9/1996 |
| EP | 0753846 A1 | 1/1997 |
| EP | 1043069 A1 | 10/2000 |
| EP | 1753846 A2 | 2/2007 |
| EP | 1893666 A1 | 3/2008 |
| EP | 2811006 A1 | 12/2014 |
| EP | 3369801 A1 | 9/2018 |
| GB | 1047698 A | 11/1966 |
| GB | 1412155 A | 10/1975 |
| GB | 1455663 A | 11/1976 |
| JP | 59-050276 A | 6/1984 |
| JP | 59-108091 A | 6/1984 |
| JP | 60-044587 A | 3/1985 |
| JP | 61-195155 A | 8/1986 |
| JP | 62-039634 B1 | 8/1987 |
| JP | 63-027596 A | 2/1988 |
| JP | 01-165692 A | 6/1989 |
| JP | 05-501829 A | 4/1993 |
| JP | 05-339357 A | 12/1993 |
| JP | 06-009966 A | 1/1994 |
| JP | 06-287574 A | 10/1994 |
| JP | 07-062355 A | 3/1995 |
| JP | 07-090282 A | 4/1995 |
| JP | 08-325580 A | 12/1996 |
| JP | 2863858 B2 | 3/1999 |
| JP | 2000-502146 | 2/2000 |
| JP | 2001-165692 A | 6/2001 |
| JP | 2003-193074 A | 7/2003 |
| JP | 2007-535604 A | 12/2007 |
| JP | 2009-541499 A | 11/2009 |
| JP | 2011-502204 | 1/2011 |
| JP | 2015-527452 A | 9/2015 |
| JP | 2018-532839 A | 11/2018 |
| KR | 10-2007-0018923 A | 2/2007 |
| RU | 2181751 C2 | 4/2002 |
| WO | 92/00807 A1 | 1/1992 |
| WO | 97/23582 A1 | 7/1997 |
| WO | 97/29841 A2 | 8/1997 |
| WO | 97/34967 A1 | 9/1997 |
| WO | 00/01408 A2 | 1/2000 |
| WO | 00/75336 A2 | 12/2000 |
| WO | 01/01408 A1 | 1/2001 |
| WO | 01/41799 A1 | 6/2001 |
| WO | 2005/104749 A2 | 11/2005 |
| WO | 2005/104752 A2 | 11/2005 |
| WO | 2006/116913 A1 | 11/2006 |
| WO | 2006/132671 A1 | 12/2006 |
| WO | 2007/078622 A2 | 7/2007 |
| WO | 2007/106783 A2 | 9/2007 |
| WO | 2008/151792 A1 | 12/2008 |
| WO | 2008/151972 A2 | 12/2008 |
| WO | 2009/058785 A2 | 5/2009 |
| WO | 2010/033487 A2 | 3/2010 |
| WO | 2012/088585 A1 | 7/2012 |
| WO | 2017/053117 A1 | 3/2017 |

OTHER PUBLICATIONS

Alberto Del Bianco et al. "Upgrading Heavy Oil Using Slurry Processes" Chemtech, Nov. 30, 1995, pp. 35-43.
Aspen Hydrocracker(Trademark): A simulation system for monitoring, planning and optimizing hydrocracking and hydrotreating units, www.aspentec.com/brochures/hydrocracker.pdf (2001).
Course: Chemical Technology (Organic) Module VI, Lecture 5 Catalytic Cracking: Fluid Catalytic Cracking and Hydrocracking downloaded Jun. 2019.
Criterion: Hydrocracking Process Description and Criterion/Zeolyst Hydrocracking Catalyst Applications, www.criterioncatalysts.com (2001).
Database CA [online] Chemical Abstracts Service retrieved from STN Database accession No. 1991:42412.
Kressmann et al., "Improvements of Ebullated-Bed Technology for Upgrading Heavy", Oil & Gas Science and Technology, vol. 55, No. 4, 2000, pp. 397-406.
Lee, Sunggyu et al, Handook of Alternative Fuel Technologies, 2007, pp. 187-188.
Lewis, Richard J., Hawley's Condensed Chemical Dictionary, 15 Edition, 2007, p. 321.
Lott et al.: "(HC)3 Process—A Slurry Hydrocracking Technology Designed to Convert Bottoms of Heavy Oils" 7th UNITAR International Conference of Heavy Crude and Tar Sands, Beijing, Oct. 27, 1998 (Oct. 27, 1998) pp. 1-8.
McFarlane et al. "Dispersion and Activity of Inorganic Catalyst Precursor in Heavy Oil" Boston Congress ACS Energy and Fuel Diversification, p. 496, Aug. 31, 1998.
Molecular Profile Report, Cobalt Benzoate, http://chemfinder.cambridgesoft.com/chembiofinder/forms/search/contentare-a/chembiovizsearch.aspx?formgroupid=8&appname=chembiofinder&allowfullsearch=true&keeprecordcountsynchronized-flase&searchcriteraid=47searchcriterava- lue=932-69-4¤tindex=0.
N. Panariti et al.: "Petroleum Residue Upgrading with Dispered Catalysts Part 1. Catalysts Activity and Selctivity" Applied Catalysts A: General, vol. 204, Mar. 31, 2000 pp. 203-213.

(56) References Cited

OTHER PUBLICATIONS

OCR Moving Bed Technology for the Future, pp. 1-2 (at least as early as 2004).
Office Action received for EA Patent Application No. 201892721, dated Jul. 8, 2020, 8 pages (4 pages of English Translation and 4 pages of Original Document).
Panariti et al.: "Petroleum Residue Upgrading with Dispersed Catalysts Part 2. Effect of Operating Conditions" Applied Catalysts A: General, vol. 204, Mar. 31, 2000 (Mar. 1, 2000) pp. 215-222.
Papaioannou et al., "Alkali-Metal- and Alkaline-Earth-Promoted Catalysts from Coal Liquefaction Applicatoins", Energy & Fuels, vol. 4, No. 1, pp. 38-42 (1990).
Plain, C. et al., "Options for Resid Conversion", Axens IFP Group Technologies, pp. 1-10 (at least as early as 2004).
Rana et al., A Review of recent advances on process technologies for upgrading of heavy oils and residua, Sep. 7, 2016, full text, retrieved from http://www.sciencedirect.com/science/article/pii/S001623610600295X on Aug. 8, 2017.
Santori, R., et al., "Eni Slurry Technology: A Technology to Convert the Bottom of the Barrel to Transportation Fuels", 3rd Bottom of the Barrell Technology Conference & Exhibition (Oct. 2004).
Seader, et al. Perry's Chemical Engineers' Handbook, 7th Ed., Section 13—Distillation, 1997, p. 13-25.
Shen et al, Hydrocracking of Liaohe Vacuum Residue With Bimeta:, Shen et al., Preprints of Symposia—American Chemical society, Division of Fuel Chemistry (1998), 43(3), 481-485, OGDEN: Psadfz, 1998, XP009117504.
U.S. Appl. filed Apr. 18, 2013, Lott et al., U.S. Appl. No. 13/856,726.
U.S. Appl. filed Apr. 18, 2013, Lott et al., U.S. Appl. No. 13/865,726.
U.S. Appl. filed Apr. 19, 2013, Lott et al., U.S. Appl. No. 13/865,726.
U.S. Appl. filed Apr. 19, 2013, Lott et al., U.S. Appl. No. 13/866,220.
U.S. Appl. filed Aug. 26, 2015, Harris et al., U.S. Appl. No. 14/836,792.
U.S. Appl. filed Dec. 3, 2013, Lott et al., U.S. Appl. No. 14/095,698.
U.S. Appl. filed Jul. 30, 2012, Harris et al., U.S. Appl. No. 13/561,479.
U.S. Appl. filed Jun. 6, 2017, Mountainland et al., U.S. Appl. No. 15/615,574.
U.S. Appl. filed May 26, 2011, Lott et al., U.S. Appl. No. 13/116,195.
U.S. Appl. filed May 23, 2011, Lott et al., U.S. Appl. No. 13/113,722.
U.S. Application filed Apr. 19, 2013, by Lott et al., U.S. Appl. No. 13/865,726.
U.S. Application filed Apr. 19, 2013, by Lott et al., U.S. Appl. No. 13/866,220.
U.S. Application filed Nov. 17, 2015, by Lott et al., U.S. Appl. No. 15/354,230.
U.S. Application filed Sep. 7, 2016, by Mountainland et al., U.S. Appl. No. 15/258,653.
U.S. Application filed Sep. 7, 2016, by Mountainland et al., U.S. Appl. No. 15/258,706.
U.S. Patent Application filed Apr. 19, 2013, by Lott et al., U.S. Appl. No. 13/865,726.
U.S. Patent Application filed Aug. 26, 2015 by Harris et al., U.S. Appl. No. 14/836,792.
U.S. Patent Application filed Jul. 30, 2012, by Harris et al., U.S. Appl. No. 13/561,479.
U.S. Patent Application filed May 23, 2011, by Lott et al., U.S. Appl. No. 13/113,722.

\* cited by examiner

EBULLATED BED REACTOR UPGRADED TO PRODUCE SEDIMENT THAT CAUSES LESS EQUIPMENT FOULING

CROSS REFERENCE TO RELATED APPLICATION

This Application is a continuation-in-part of U.S. patent application Ser. No. 15/908,111, filed Feb. 28, 2018, now issued U.S. Pat. No. 11,118,119, which claims the benefit of U.S. Provisional Application No. 62/466,011, filed Mar. 2, 2017, which are incorporated by reference in their entirety.

BACKGROUND OF THE INVENTION

1. The Field of the Invention

The invention relates to heavy oil hydroprocessing methods and systems, such as ebullated bed hydroprocessing methods and systems, which are modified and upgraded to produce sediment that causes less equipment fouling at a given sediment production rate or concentration.

2. The Relevant Technology

There is an ever-increasing demand to more efficiently utilize low quality heavy oil feedstocks and extract fuel values therefrom. Low quality feedstocks are characterized as including relatively high quantities of hydrocarbons that nominally boil at or above 524° C. (975° F.). They also contain relatively high concentrations of asphaltenes, sulfur, nitrogen and metals. High boiling fractions derived from these low quality feedstocks typically have a high molecular weight (often indicated by higher density and viscosity) and/or low hydrogen/carbon ratio, which is related to the presence of high concentrations of undesirable components, including asphaltenes and carbon residue. Asphaltenes and carbon residue are difficult to process and commonly cause fouling of conventional catalysts and hydroprocessing equipment because they contribute to the formation of coke and sediment.

In a given ebullated bed system, the rate of production of converted products is often limited by fouling. When attempts are made to increase production of converted products beyond a certain practical limit, the rate of fouling of heat exchangers and other process equipment becomes too rapid, requiring more frequent shutdowns for maintenance and cleaning. A refinery operator typically relates the observed rate of equipment fouling to measurements of sediment production and arrives at an operating sediment limit, above which the refinery will avoid operating the ebullated bed hydrocracker. It is generally assumed that for any given production rate and/or sediment concentration, there is a corresponding rate of equipment fouling. The conventional knowledge is that the only way to reduce equipment fouling caused by sediment is to reduce the production rate and/or concentration of sediment. Thus, sediment production and equipment fouling place practical upper limits on conversion and the rate of production of converted products.

Low quality heavy oil feedstocks contain high concentrations of asphaltenes, carbon residue, sulfur, nitrogen, and metals. Examples include heavy crude, oil sands bitumen, and residuum left over from conventional refinery process. Residuum (or "resid") can refer to atmospheric tower bottoms and vacuum tower bottoms. Atmospheric tower bottoms can have a boiling point of at least 343° C. (650° F.) although it is understood that the cut point can vary among refineries and be as high as 380° C. (716° F.). Vacuum tower bottoms (also known as "resid pitch" or "vacuum residue") can have a boiling point of at least 524° C. (975° F.), although it is understood that the cut point can vary among refineries and be as high as 538° C. (1000° F.) or even 565° C. (1050° F.).

By way of comparison, Alberta light crude contains about 9 vol % vacuum residue, while Lloydminster heavy oil contains about 41 vol % vacuum residue, Cold Lake bitumen contains about 50 vol % vacuum residue, and Athabasca bitumen contains about 51 vol % vacuum residue. As a further comparison, a relatively light oil such as Dansk Blend from the North Sea region only contains about 15 vol % vacuum residue, while a lower-quality European oil such as Ural contains more than 30 vol % vacuum residue, and an oil such as Arab Medium is even higher, with about 40 vol % vacuum residue.

Converting heavy oil into useful end products involves extensive processing, such as reducing the boiling point of the heavy oil, increasing the hydrogen-to-carbon ratio, and removing impurities such as metals, sulfur, nitrogen and coke precursors. Examples of hydrocracking processes using conventional heterogeneous catalysts to upgrade atmospheric tower bottoms include fixed-bed hydroprocessing, ebullated-bed hydroprocessing, and moving-bed hydroprocessing. Noncatalytic upgrading processes for upgrading vacuum tower bottoms include thermal cracking, such as delayed coking, flexicoking, visbreaking, and solvent extraction.

There remains a need to improve heavy oil upgrading processes in a way that reduces the rate of equipment fouling caused by sediment production.

SUMMARY OF THE INVENTION

Disclosed herein are methods for upgrading an ebullated bed hydroprocessing system to produce sediment that causes less equipment fouling. Also disclosed are upgraded ebullated bed hydroprocessing systems to produce sediment that causes less equipment fouling. Upgrading an ebullated bed hydroprocessing system to produce less fouling sediment is characterized by a reduction in the rate of equipment fouling for a given sediment production rate and/or sediment concentration compared to sediment produced by the same ebullated bed hydroprocessing system in the absence of upgrading to process less fouling sediment.

The disclosed methods and systems involve the use of a dual catalyst system comprised of a solid supported catalyst and well-dispersed (e.g., homogeneous) catalyst particles in combination with selected processing conditions related to reactor severity. The dual catalyst system and selected severity permit an ebullated bed reactor to operate at same or higher severity for heavy oil of a given quality because the sediment that is produced causes less equipment fouling compared to sediment produced by the same reactor prior to upgrading.

In some embodiments, a method of upgrading an ebullated bed hydroprocessing system to produce sediment that causes less equipment fouling comprises: (1) operating an ebullated bed reactor using a heterogeneous catalyst to hydroprocess heavy oil at initial conditions, including an initial production rate of converted products, an initial sediment production rate and/or concentration in a process stream, and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor at modified conditions using the dual catalyst system to produce modified sediment in a process stream that is less fouling, resulting in a reduced rate of equipment fouling for a given sediment production rate and/or concentration compared to when operating the ebullated bed reactor at the initial conditions.

In some embodiments, operating the upgraded ebullated bed reactor at modified conditions using the dual catalyst system to produce sediment that causes less equipment fouling comprises at least one of: (i) operating at conditions that reduce the sediment production rate and/or concentration in the process stream by a certain percentage and reduce the rate of equipment fouling by an even greater percentage than the percent reduction in sediment production rate and/or concentration; (ii) operating at conditions that maintain the same or similar sediment production rate and/or concentration and reduce the rate of equipment fouling; or (iii) operating at conditions that increase the sediment production rate and/or concentration and maintain or reduce the rate of equipment fouling.

In some embodiments, operating the upgraded ebullated bed reactor at modified conditions using the dual catalyst system to produce less fouling sediment comprises: (i) operating at conditions that produce converted products at the same or similar rate as the initial production rate of converted products when operating at the initial conditions; (ii) the conditions reducing the sediment production rate and/or concentration in the process stream by a certain percentage compared to the initial sediment production rate and/or concentration when operating at the initial conditions; and (iii) equipment fouling occurring at a reduced rate compared to the initial rate of equipment fouling when operating at the initial conditions, and wherein the rate of equipment fouling is reduced by an even greater percentage than the percent reduction in sediment production rate and/or concentration.

In some embodiments, operating the upgraded ebullated bed reactor at modified conditions using the dual catalyst system to produce less fouling sediment comprises: (i) operating at conditions that produce converted products at a higher rate than the initial production rate of converted products when operating at the initial conditions; (ii) the conditions producing sediment in the process stream at the same or similar rate and/or concentration as the initial sediment production rate and/or concentration when operating at the initial conditions; and (iii) equipment fouling occurring at a reduced rate compared to the initial rate of equipment fouling when operating at the initial conditions.

In some embodiments, operating the upgraded ebullated bed reactor at modified conditions using the dual catalyst system to produce less fouling sediment comprises: (i) operating at conditions that produce converted products at a higher rate than the initial production rate of converted products when operating at the initial conditions; (ii) the conditions producing sediment in the process stream at a higher rate and/or concentration than when operating at the initial conditions; and (iii) equipment fouling occurring at a rate that is no higher than the initial rate of equipment fouling when operating at the initial conditions.

In some embodiments, the production rate of converted products can be increased, when operating the upgraded ebullated bed reactor at modified conditions using the dual catalyst system, by at least one of: (i) higher temperature and higher conversion at same or similar throughput as when operating at the initial conditions; (ii) higher temperature and higher throughput at same or similar conversion as when operating at the initial conditions; or (iii) higher temperature, higher throughput, and higher conversion than when operating at the initial conditions.

In some embodiments, the production rate of converted products can be increased by increasing throughput by at least 2.5%, at least 5%, at least 10%, or at least 20% when operating the upgraded ebullated bed reactor than when operating at the initial conditions. In some embodiments, the production rate of converted products can be increased by increasing conversion by at least 2.5%, at least 5%, at least 7.5%, at least 10%, or at least 15% when operating the upgraded ebullated bed reactor than when operating at the initial conditions. In some embodiments, increasing the production rate of converted products can be increased by by increasing reactor temperature by at least 2.5° C., at least 5° C., at least 7.5° C., or at least 10° C. when operating the upgraded ebullated bed reactor than when operating at the initial conditions.

In some embodiments, the rate of equipment fouling can be determined, when operating at the initial conditions and when operating the upgraded ebullated bed reactor at modified conditions using the dual catalyst system, by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

In some embodiments, sediment production can be determined, when operating at the initial conditions and when operating the upgraded ebullated bed reactor at modified conditions using the dual catalyst system, by at least one of: (i) absolute rate of sediment production (e.g., quantity per unit time); or (ii) sediment concentration in at least one process stream. In some embodiments, the sediment concentration can be measured in at least one process stream selected from atmospheric residue, atmospheric distillation tower bottoms, vacuum residue, vacuum distillation tower bottoms, atmospheric tower feed, hot low pressure separator product, fuel oil product, or vacuum tower bottoms after addition of cutter stocks.

In some embodiments, after upgrading the ebullated bed reactor to operate at modified conditions and using the dual catalyst system, the sediment production rate and/or concentration in a process stream is maintained or increased compared to the initial sediment production rate and/or concentration, and the rate of equipment fouling is decreased by at least 5%, 25%, 50%, or 75% compared to the initial rate of equipment fouling when operating the ebullated bed reactor at the initial conditions.

In some embodiments, after upgrading the ebullated bed reactor to operate at modified conditions and using the dual catalyst system, the sediment production rate is increased by at least 2%, 10%, 20%, or 33% compared to the initial sediment production rate, and the rate of equipment fouling is maintained or decreased compared to the initial rate of equipment fouling when operating the ebullated bed reactor at the initial conditions.

In some embodiments, after upgrading the ebullated bed reactor to operate at modified conditions and using the dual catalyst system, the sediment concentration in the process stream is increased by at least 2%, 10%, 20%, or 33% compared to the initial sediment concentration in the process stream, and the rate of equipment fouling is maintained or decreased compared to the initial rate of equipment fouling when operating the ebullated bed reactor at the initial conditions.

In some embodiments, after upgrading the ebullated bed reactor to operate at modified conditions and using the dual catalyst system, the sediment production rate is reduced by at least 2%, 10%, 30%, or 50% compared to the initial sediment production rate, and the rate of equipment fouling is reduced by an even greater percentage than the percent reduction in the sediment production rate compared to the initial rate of equipment fouling, when operating the ebullated bed reactor at the initial conditions.

In some embodiments, after upgrading the ebullated bed reactor to operate at modified conditions and using the dual catalyst system, the sediment concentration in the process stream is reduced by at least 2%, 10%, 30%, or 50% compared to the initial sediment concentration in the process stream, and the rate of equipment fouling is reduced by an even greater percentage than the percent reduction in the sediment concentration compared to the initial rate of equipment fouling, when operating the ebullated bed reactor at the initial conditions.

In view of the foregoing, it can be seen that, for a given sediment production rate and/or concentration in the process stream, the rate of equipment fouling can be reduced by at least about 5%, 10%, 15%, 20%, 25%, 30%, 40%, 50%, 60%, or 75%, when operating the upgraded ebullated bed reactor at the modified conditions while using the dual catalyst system, compared to the rate of equipment fouling for the given sediment production rate and/or concentration in the process stream when operating the ebullated bed reactor at the initial conditions.

When comparing the rate of equipment fouling to the sediment production rate and/or concentration before and after upgrading the ebullated bed reactor to produce a lower quantity of sediment, the decrease in equipment fouling has been shown to be about 3 times to about 20 times greater than the decrease in sediment quantity (see examples below). This correlates with sediment being about 3 to 20 times less fouling than the baseline sediment when upgrading the ebullated bed reactor according to the invention.

In some embodiments, the dispersed metal sulfide catalyst particles are less than 1 μm in size, or less than about 500 nm in size, or less than about 250 nm in size, or less than about 100 nm in size, or less than about 50 nm in size, or less than about 25 nm in size, or less than about 10 nm in size, or less than about 5 nm in size.

In some embodiments, the dispersed metal sulfide catalyst particles are formed in situ within the heavy oil from a catalyst precursor. By way of example and not limitation, the dispersed metal sulfide catalyst particles can be formed by blending a catalyst precursor into an entirety of the heavy oil prior to thermal decomposition of the catalyst precursor and formation of active metal sulfide catalyst particles. By way of further example, methods may include mixing a catalyst precursor with a diluent hydrocarbon to form a diluted precursor mixture, blending the diluted precursor mixture with the heavy oil to form conditioned heavy oil, and heating the conditioned heavy oil to decompose the catalyst precursor and form the dispersed metal sulfide catalyst particles in situ within the heavy oil.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Figure 1:
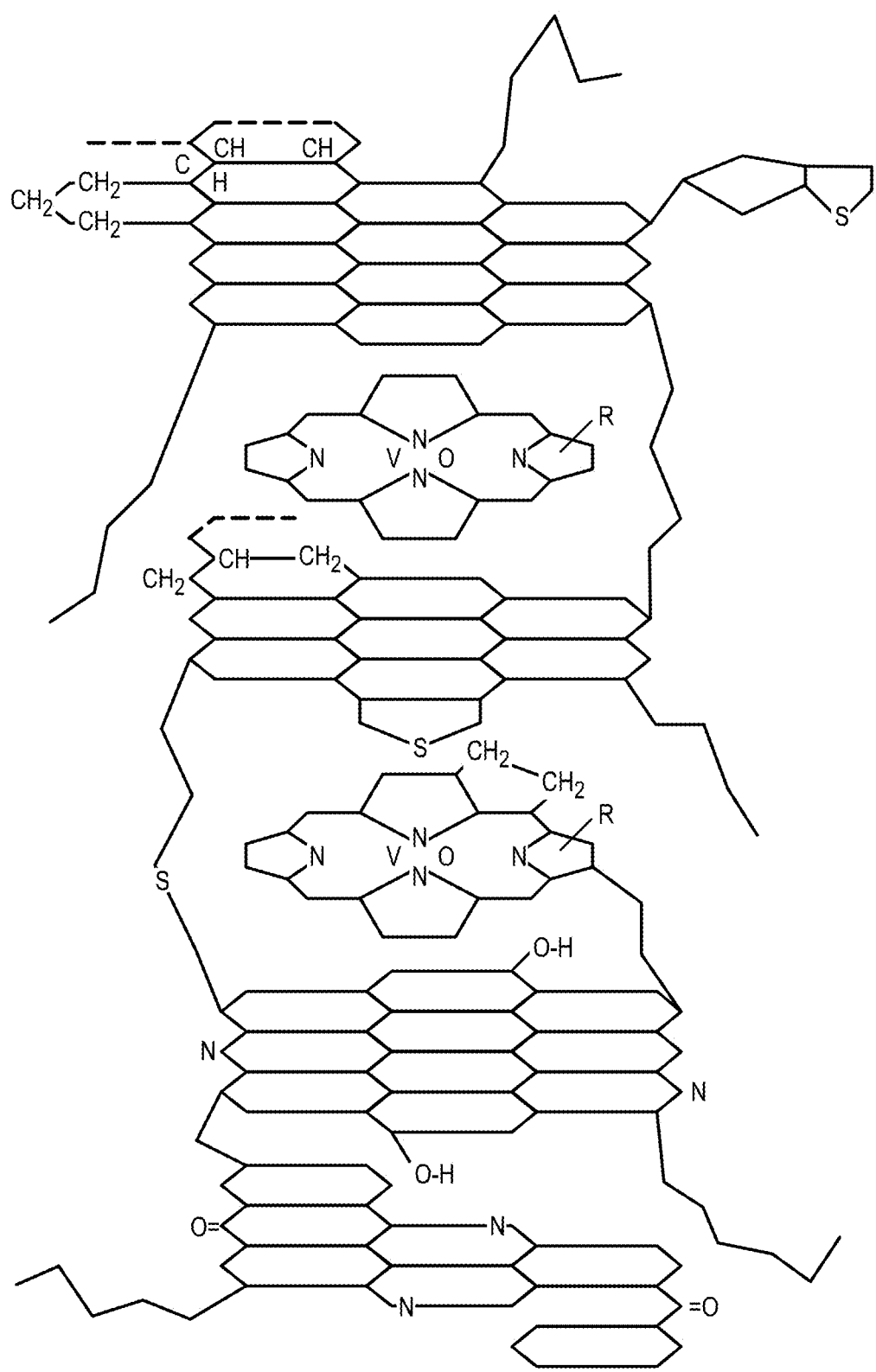
FIG. 1 depicts a hypothetical molecular structure of asphaltene.

The present invention relates to methods for upgrading an ebullated bed hydroprocessing system to produce "less fouling" sediment (i.e., sediment that causes less equipment fouling at a given concentration and/or production rate). An upgraded ebullated bed system is created by carrying out the disclosed method.

The term "sediment" refers to solids formed in a liquid stream that can settle out within equipment of a heavy oil hydroprocessing system. Sediments can include inorganics, coke, or insoluble asphaltenes that precipitate after conversion. Sediment in petroleum products is commonly measured using the IP-375 hot filtration test procedure for total sediment in residual fuel oils published as part of ISO 10307 and ASTM D4870. Other tests include the IP-390 sediment test and the Shell hot filtration test. Sediment is related to components of the oil that have a propensity for forming solids during processing and handling. These solid-forming components have multiple undesirable effects in a hydroconversion process, including degradation of product quality (e.g., bottoms quality) and operability problems related to equipment fouling. It should be noted that although the strict definition of sediment is based on the measurement of solids in a sediment test, the term is commonly used more loosely to refer to the solids-forming components of the oil itself, which may not be present in the oil as actual solids, but which contribute to solids formation under certain conditions.

All crudes have a vacuum resid component with a characteristic "sediment forming tendency". Although the sediment forming tendency of a heavy oil feedstock is not always quantifiable, some heavy oil feedstocks have lesser or greater sediment forming tendencies, For example, Eastern European crude oils such as Ural, South American crude oils such as Venezuelan and Colombian, and some Central or North American crude oils such as Mexican, and certain Gulf of Mexico crudes, have vacuum resid components with significantly higher sediment forming tendency compared to ordinary crudes, such as West Texas Intermediate crude oil, Alaska North Slope crude oil, many African crude oils, North Sea crude oils, and most Middle Eastern crude oils, including Arabian Medium Crude, Arabian Heavy Crude, and Bonny Light Crude.

"Sediment production" may be expressed as the absolute production rate in mass per unit time (e.g., lb/hr or kg/hr) or as the concentration (e.g., wt %) within a process stream. Therefore, sediment production may be determined, when operating an ebullated bed reactor at initial conditions and when operating an upgraded ebullated bed reactor at modified conditions using the dual catalyst system, by at least one of (i) absolute sediment production rate or (ii) sediment concentration in at least one process stream. For example, sediment concentration can be measured in one or more of the following process streams: atmospheric residue, atmospheric distillation tower bottoms, vacuum residue, vacuum distillation tower bottoms, atmospheric tower feed, hot low pressure separator product, fuel oil product, vacuum tower bottoms after addition of cutter stocks.

It should be noted that sediment production rate and/or concentration can be changed by modifying the operating conditions of the ebullated bed reactor while using the dual catalyst system, but not necessarily both simultaneously, depending on the details of the selected operating conditions. For example, when a unit is operated at significantly higher total rate of production of converted products, the total amount of bottoms product after separation (e.g., by hot separation, atmospheric distillation and/or vacuum distillation) may be reduced, particularly in cases where higher production is achieved through the use of higher temperature and conversion at equal throughput. In such cases, the measured sediment concentration in the liquid product or other process stream may be equal to or higher than when operating at initial conditions, even if the absolute sediment production rate is lower.

The term "fouling" refers to the formation of an undesirable phase (foulant) that interferes with processing. The foulant is normally a carbonaceous material or solid that deposits and collects within the processing equipment. Equipment fouling can result in loss of production due to equipment shutdown, decreased performance of equipment, increased energy consumption due to the insulating effect of foulant deposits in heat exchangers or heaters, increased maintenance costs for equipment cleaning, reduced efficiency of fractionators, and reduced reactivity of the heterogeneous catalyst.

The "rate of equipment fouling" before and after upgrading a hydrocracking reactor to operate at modified conditions while using the dual catalyst system can be determined by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnaround.

The terms "heavy oil" and "heavy oil feedstock" refer to heavy crude, oil sands bitumen, bottom of the barrel and residuum left over from refinery processes, such as visbreaker bottoms, and any other lower quality materials that contain a substantial quantity of high boiling hydrocarbon fractions and/or that include a significant quantity of asphaltenes that can deactivate a heterogeneous catalyst and/or cause or result in formation of coke precursors and sediment. Examples of heavy oils include, but are not limited to, Lloydminster heavy oil, Cold Lake bitumen, Athabasca bitumen, atmospheric tower bottoms, vacuum tower bottoms, residuum (or "resid"), resid pitch, vacuum residue (e.g., Ural VR, Arab Medium VR, Athabasca VR, Cold Lake VR, Maya VR, and Chichimene VR), deasphalted liquids obtained by solvent deasphalting, asphaltene liquids obtained as a byproduct of deasphalting, and non-volatile liquid fractions that remain after subjecting crude oil, bitumen from tar sands, liquefied coal, oil shale, or coal tar feedstocks to distillation, hot separation, solvent extraction, and the like. By way of further example, atmospheric tower bottoms (ATB) can have a nominal boiling point of at least 343° C. (650° F.) although it is understood that the cut point can vary among refineries and be as high as 380° C. (716° F.). Vacuum tower bottoms can have a nominal boiling point of at least 524° C. (975° F.), although it is understood that the cut point can vary among refineries and be as high as 538° C. (1000° F.) or even 565° C. (1050° F.).

The terms "asphaltene" and "asphaltenes" refer to materials in heavy oil feedstocks and resids that are typically insoluble in paraffinic solvents, such as propane, butane, pentane, hexane, and heptane. Asphaltenes can include sheets of condensed ring compounds held together by heteroatoms, such as sulfur, nitrogen, oxygen and metals. Asphaltenes broadly include a wide range of complex compounds having anywhere from 80 to 1200 carbon atoms, with predominating molecular weights, as determined by solution techniques, in the 1200 to 16,900 range. About 80-90% of the metals in the crude oil are contained in the asphaltene fraction which, together with a higher concentration of non-metallic heteroatoms, renders the asphaltene molecules more hydrophilic and less hydrophobic than other hydrocarbons in crude or heavy oil resids.

A hypothetical asphaltene molecule structure developed by A. G. Bridge and co-workers at Chevron is depicted in FIG. 1. Asphaltenes are typically defined based on the results of insolubles analyses, and more than one definition of asphaltenes may be used. Specifically, a commonly used definition of asphaltenes is heptane insolubles minus toluene insolubles (i.e., asphaltenes are soluble in toluene; sediments and residues insoluble in toluene are not counted as asphaltenes). Asphaltenes defined in this fashion may be referred to as "$C_7$ asphaltenes". Another definition is measured as pentane insolubles minus toluene insolubles, and commonly referred to as "$C_5$ asphaltenes". In the examples of the present invention, the $C_7$ asphaltene definition is used, but the $C_5$ asphaltene definition can be readily substituted.

The "quality" of heavy oil can be measured by at least one characteristic selected from, but not limited to: (i) boiling point; (ii) concentration of sulfur; (iii) concentration of nitrogen; (iv) concentration of metals; (v) molecular weight; (vi) viscosity, (vii) hydrogen to carbon ratio; (viii) asphaltene content; and (ix) sediment forming tendency.

A "lower quality heavy oil" and/or "lower quality feedstock blend" can have at least one lower quality characteristic compared to an initial heavy oil feedstock selected from, but not limited to: (i) higher boiling point; (ii) higher concentration of sulfur; (iii) higher concentration of nitrogen; (iv) higher concentration of metals; (v) higher molecular weight (often indicated by higher density and viscosity); (vi) higher viscosity, (vii) lower hydrogen to carbon ratio; (viii) higher asphaltene content; and (ix) greater sediment forming tendency.

The term "opportunity feedstock" refers to lower quality heavy oils and lower quality heavy oil feedstock blends having at least one lower quality characteristic compared to an initial heavy oil feedstock. An opportunity feedstock typically has a lower market value (or price) compared to an initial feedstock.

The terms "hydrocracking" and "hydroconversion" refer to processes whose primary purpose is to reduce the boiling range of heavy oil and in which a substantial portion of the heavy oil is converted into products with boiling ranges lower than that of the original feed. Hydrocracking or hydroconversion generally involves fragmentation of larger hydrocarbon molecules into smaller molecular fragments having a smaller number of carbon atoms and a higher hydrogen-to-carbon ratio. The mechanism by which hydrocracking occurs typically involves the formation of hydrocarbon free radicals during thermal fragmentation, followed by capping of free radicals with hydrogen. The hydrogen atoms or radicals that react with hydrocarbon free radicals during hydrocracking can be generated at or by active catalyst sites.

The term "hydrotreating" refers to processes whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can be used, examples of which are an ebullated bed hydrotreater and slurry phase hydrotreater.

Of course, "hydrocracking" or "hydroconversion" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The term "hydrocracking reactor" refers to any vessel in which hydrocracking (i.e., reducing the boiling range) of a feedstock in the presence of hydrogen and a hydrocracking catalyst is the primary purpose. Hydrocracking reactors are characterized as having one or more inlet ports into which heavy oil and hydrogen are introduced, an outlet port from which an upgraded feedstock or material is withdrawn, and sufficient thermal energy that promotes fragmentation of larger hydrocarbon molecules into smaller molecules, causing formation of hydrocarbon free radicals. Examples of hydrocracking reactors include, but are not limited to, slurry phase reactors (i.e., two-phase, gas-liquid system), ebullated bed reactors (i.e., three-phase, gas-liquid-solid system), and fixed bed reactors (i.e., three-phase system that includes a liquid feed trickling downward over or flowing upward through a fixed bed of solid heterogeneous catalyst with hydrogen typically flowing co-currently with, but possibly counter-currently, to the heavy oil).

The term "hydrocracking temperature" refers to a minimum temperature required to cause significant hydrocracking of a heavy oil feedstock. In general, hydrocracking temperatures will preferably fall within a range of about 399° C. (750° F.) to about 460° C. (860° F.), more preferably in a range of about 418° C. (785° F.) to about 443° C. (830° F.), and most preferably in a range of about 421° C. (790° F.) to about 440° C. (825° F.).

The term "gas-liquid slurry phase hydrocracking reactor" refers to a hydroprocessing reactor that includes a continuous liquid phase and a gaseous dispersed phase, which forms a "slurry" of gaseous bubbles within the liquid phase. The liquid phase typically comprises a hydrocarbon feedstock that may contain a low concentration of dispersed metal sulfide catalyst particles, which can behave colloidally or as a pseudo solute, and the gaseous phase typically comprises hydrogen gas, hydrogen sulfide, and vaporized low boiling point hydrocarbon products. The liquid phase can optionally include a hydrogen donor solvent.

The term "gas-liquid-solid, 3-phase slurry hydrocracking reactor" is used when a solid catalyst is employed along with liquid and gas. The gas may contain hydrogen, hydrogen sulfide, and vaporized low boiling hydrocarbon products. The term "slurry phase reactor" shall broadly refer to both type of reactors (e.g., those with dispersed metal sulfide catalyst particles, those with a micron-sized or larger particulate catalyst, and those that include both).

The terms "solid heterogeneous catalyst", "heterogeneous catalyst" and "supported catalyst" refer to catalysts typically used in ebullated bed and fixed bed hydroprocessing systems, including catalysts designed primarily for hydrocracking, hydroconversion, hydrodemetallization, and/or hydrotreating. A heterogeneous catalyst typically comprises a catalyst support structure having a large surface area and interconnected channels or pores and fine active catalyst particles, such as sulfides of cobalt, nickel, tungsten, and/or molybdenum, dispersed within the channels or pores. The pores of the support are typically of limited size to maintain mechanical integrity of the heterogeneous catalyst and prevent breakdown and formation of excessive fines in the reactor. Heterogeneous catalysts can be produced as cylindrical pellets, cylindrical extrudates, other shapes such as trilobes, rings, saddles, or the like, or spherical solids.

The terms "dispersed metal sulfide catalyst particles" and "dispersed catalyst" refer to catalyst particles having a particle size below 1 μm (submicron, or sub micrometer), preferably less than about 500 nm, or less than about 250 nm, or less than about 100 nm, or less than about 50 nm, or less than about 25 nm, or less than about 10 nm, or less than about 5 nm. The term "dispersed metal sulfide catalyst particles" may include molecular or molecularly-dispersed catalyst compounds. The term "dispersed metal sulfide catalyst particles" typically excludes metal sulfide particles and agglomerates of metal sulfide particles that are larger than 1 μm.

The term "molecularly-dispersed catalyst" shall refer to catalyst compounds that are essentially "dissolved" or dissociated from other catalyst compounds or molecules in a hydrocarbon feedstock or suitable diluent. It can include very small catalyst particles that contain a few catalyst molecules joined together (e.g., 15 molecules or less).

The terms "residual dispersed catalyst particles" and "residual dispersed metal sulfide catalyst particles" refer to catalyst particles that remain with a hydrocarbon product when transferred from one vessel to another (e.g., from a hydroprocessing reactor to a separator and/or other hydroprocessing reactor). Residual dispersed metal sulfide catalyst particles may also remain in a liquid residual fraction after separation of a hydrocarbon product into distillates and residual liquid, such as by hot separation, atmospheric distillation, or vacuum distillation.

The term "conditioned feedstock" refers to a hydrocarbon feedstock into which a catalyst precursor has been combined and mixed sufficiently so that, upon decomposition of the catalyst precursor and formation of the active catalyst, the catalyst will comprise dispersed metal sulfide catalyst particles formed in situ within the feedstock.

The terms "upgrade", "upgrading" and "upgraded", when used to describe a feedstock that is being or has been subjected to hydroprocessing, or a resulting material or product, refer to one or more of a reduction in molecular weight of the feedstock, a reduction in boiling point range of the feedstock, a reduction in concentration of asphaltenes, a reduction in concentration of hydrocarbon free radicals, and/or a reduction in quantity of impurities, such as sulfur, nitrogen, oxygen, halides, and metals.

The term "severity" refers to the amount of energy that is introduced into heavy oil during hydroprocessing and is related to the operating temperature of the hydroprocessing reactor (i.e., higher temperature is related to higher severity and lower temperature is related to lower severity at same or similar throughput) in combination with duration or residence time. Increased severity generally increases the quantity of converted products produced by the hydroprocessing reactor, including both desirable products and undesirable products. Conversion and throughput also affect severity. For example, when temperature is increased and throughput is held constant, conversion typically increases for a given feedstock. In order to maintain temperature while increasing throughput (i.e., increasing the liquid hourly space velocity), which decreases residence time of the heavy oil in the reactor, more heat energy must be added to the system to offset the cooling effect of passing a greater quantity per unit time of initially cooler heavy oil into the reactor.

Desirable conversion products include hydrocarbons of reduced molecular weight, boiling point, and specific gravity, which can include end products such as naphtha, diesel, jet fuel, kerosene, wax, fuel oil, and the like. Other desirable conversion products include higher boiling hydrocarbons that can be further processed using conventional refining and/or distillation processes. Bottoms products of sufficient quality to be useful as fuel oil are other examples of desirable conversion products.

Undesirable conversion products include coke, sediment, metals, and other solid materials that can deposit on hydroprocessing equipment and cause fouling, such as interior components of reactors, separators, filters, pipes, towers, heat exchangers, and the heterogeneous catalyst. Undesirable conversion products can also refer to unconverted resid that remains after distillation, such as atmospheric tower bottoms ("ATB") or vacuum tower bottoms ("VTB"), particularly which are of too low of quality to be useful as fuel oil or other desired use. Minimizing undesirable conversion products reduces equipment fouling and shutdowns required to clean the equipment. Nevertheless, there may be a desirable quantity of unconverted resid in order for downstream separation equipment to function properly and/or to provide a liquid transport medium for carrying coke, sediment, metals, and other solid materials that might otherwise deposit on and foul equipment but that can be transported away by the remaining resid.

In addition to temperature, "severity" can be related to one or both of "conversion" and "throughput". Whether increased severity involves increased conversion and/or increased or decreased throughput may depend on the quality of the heavy oil feedstock and/or the mass balance of the overall hydroprocessing system. For example, where it is desired to convert a greater quantity of feed material and/or provide a greater quantity of material to downstream equipment, increased severity may primarily involve increased throughput without necessarily increasing fractional conversion. This can include the case where resid fractions (ATB and/or VTB) are sold as fuel oil, and increased conversion without increased throughput might decrease the quantity of this product. In the case where it is desired to increase the ratio of upgraded materials to resid fractions, it may be desirable to primarily increase conversion without necessarily increasing throughput. Where the quality of heavy oil introduced into the hydroprocessing reactor fluctuates, it may be desirable to selectively increase or decrease one or both of conversion and throughput to maintain a desired ratio of upgraded materials to resid fractions and/or a desired absolute quantity or quantities of end product(s) being produced.

The terms "conversion" and "fractional conversion" refer to the proportion, often expressed as a percentage, of heavy oil that is converted into lower boiling and/or lower molecular weight materials. Conversion is expressed as a percentage of the initial resid content (i.e., components with boiling points greater than a defined residue cut point) that is converted to products with boiling points less than the defined cut point. The definition of residue cut point can vary and can nominally include 524° C. (975° F.), 538° C. (1000° F.), 565° C. (1050° F.), and the like. It can be measured by distillation analysis of feed and product streams to determine the concentration of components with boiling point greater than the defined cut point. Fractional conversion is expressed as (F−P)/F, where F is the quantity of resid in the combined feed streams and P is the quantity in the combined product streams, where both feed and product resid content are based on the same cut point definition. The quantity of resid is most often defined based on the mass of components with boiling point greater than the defined cut point, but volumetric or molar definitions can also be used.

The conversion of asphaltenes can be different than the overall conversion of heavy oil. For purposes of this disclosure, a useful definition of asphaltene conversion is based on the relative amounts of asphaltenes in the fresh feedstock and upgraded product, and can be defined by the following, which results in a decimal fraction between 0 and 1, which can be converted into a percentage by multiplying by 100:

Conv=[Asph(fresh feed)−Asph(products)]/Asph(fresh feed).

The asphaltene content of a recycle stream is internal to the process. When conversion of asphaltenes is too low compared to conversion of heavy oil as a whole, recycle buildup of asphaltenes can occur.

The term "throughput" refers to the quantity (mass or volume) of feed material introduced into the hydroprocessing reactor per unit of time. Throughput can be expressed in volumetric terms, such as barrels per hour or per day, or in mass terms, such as metric tons per hour or per day. In common usage, throughput is defined as the mass or volumetric feed rate of only the heavy oil feedstock itself (for example, vacuum tower bottoms or the like). The definition normally excludes the quantity of diluents or other components that can be added to or included in the overall feeds to a hydroconversion unit, although a definition which includes those other components can also be used.

The terms "space velocity" and "liquid hourly space velocity" are related to the throughput of a particular reactor or reactor size but are normalized to remove the size (volume) of the reactor. Thus, a larger reactor can have twice the throughput but the same space velocity as a reactor with half the volume size. Therefore, an increase in space velocity is typically proportional to an increase in throughput for a given reactor size. Space velocity is inversely proportional to residence time of heavy oil in a reactor of given reactor size.

The "production rate of converted products" is an absolute rate that can be expressed in volumetric terms, such as barrels per or hour or per day, or in mass terms, such as metric tons per hour or per day. The "production rate of converted products" should not be confused with yield or efficiency, which are sometimes erroneously called "rate" (e.g., production rate per unit feed rate, or production rate per unit converted feed). It will be appreciated that the actual numeric values of both initial production rate of converted products and increased production rate of converted products are specific to an individual production facility and depend on the capacity of that facility. Therefore, it is valid to compare the production rate of the unit or facility in question before and after modification but not against a different unit or facility built with a different capacity.

II. Ebullated Bed Hydroprocessing Reactors and Systems

FIGS. 2A-2D schematically depict non-limiting examples of ebullated bed hydroprocessing reactors and systems used to hydroprocess hydrocarbon feedstocks such as heavy oil, which can be upgraded to operate at modified conditions, including modified reactor severity based on temperature, conversion, and throughput, while using a dual catalyst system to produce less fouling sediment according to the invention. It will be appreciated that the example ebullated bed hydroprocessing reactors and systems can include interstage separation, integrated hydrotreating, and/or integrated hydrocracking.

The heavy oil feedstocks that are hydroprocessed may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, and other resid fractions. Heavy oils and resids can include a significant fraction of high boiling point hydrocarbons (i.e., nominally at or above 343° C. (650° F.), more particularly nominally at or above about 524° C. (975° F.)) and/or asphaltenes. Asphaltenes are complex hydrocarbon molecules that include a relatively low ratio of hydrogen to carbon that is the result of a substantial number of condensed aromatic and naphthenic rings with paraffinic side chains (See FIG. 1). Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

Figure 2A:
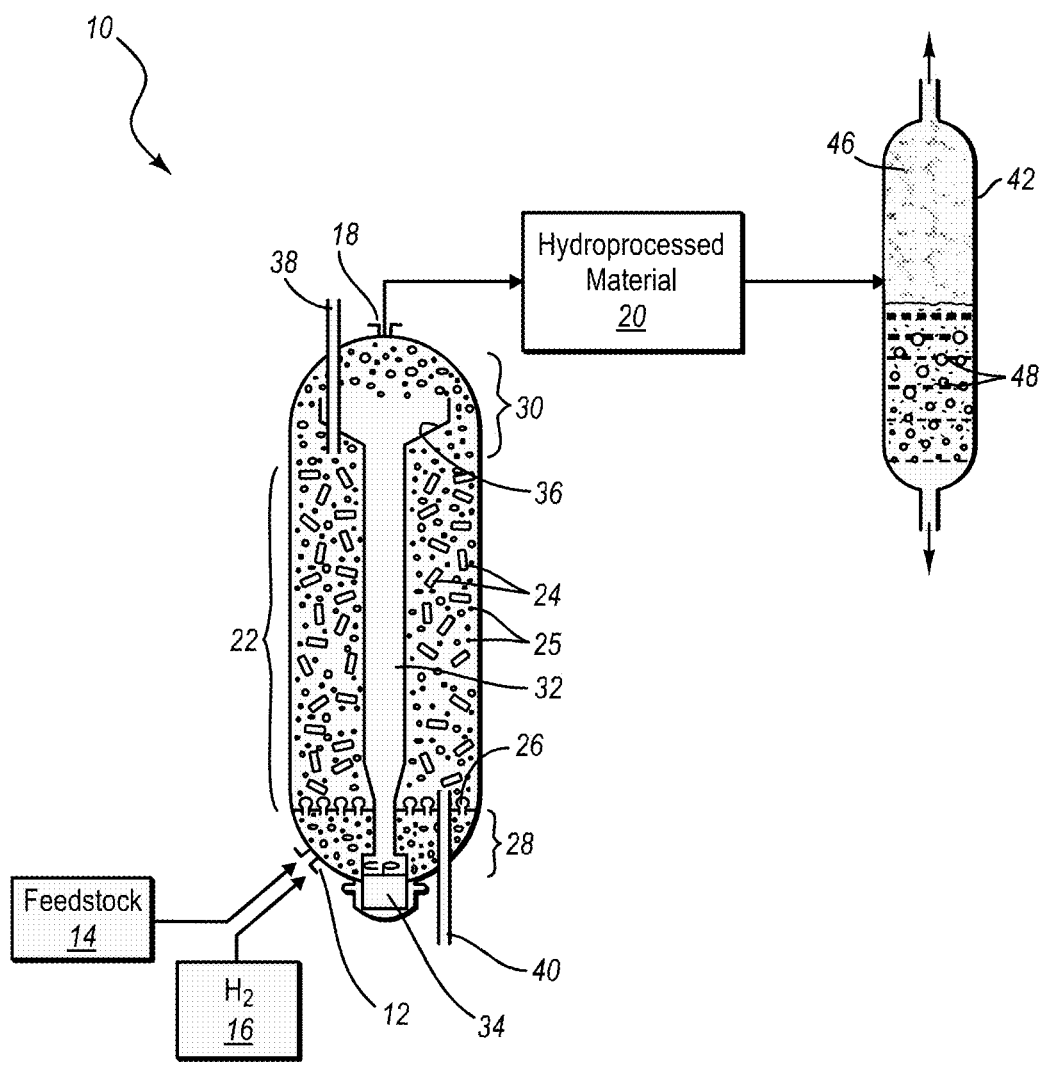
FIGS. 2A and 2B schematically illustrate exemplary ebullated bed reactors.

FIG. 2A schematically illustrates an ebullated bed hydroprocessing reactor 10 used in the LC-Fining hydrocracking system developed by C-E Lummus. Ebullated bed reactor 10 includes an inlet port 12 near the bottom, through which a feedstock 14 and pressurized hydrogen gas 16 are introduced, and an outlet port 18 at the top, through which hydroprocessed material 20 is withdrawn.

Ebullated bed reactor 10 further includes an expanded catalyst zone 22 comprising a heterogeneous catalyst 24 that is maintained in an expanded or fluidized state against the force of gravity by upward movement of liquid hydrocarbons and gas (schematically depicted as bubbles 25) through ebullated bed reactor 10. The lower end of expanded catalyst zone 22 is defined by a distributor grid plate 26, which separates expanded catalyst zone 22 from a lower heterogeneous catalyst free zone 28 located between the bottom of ebullated bed reactor 10 and distributor grid plate 26. Distributor grid plate 26 is configured to distribute the hydrogen gas and hydrocarbons evenly across the reactor and prevents heterogeneous catalyst 24 from falling by the force of gravity into lower heterogeneous catalyst free zone 28. The upper end of the expanded catalyst zone 22 is the height at which the downward force of gravity begins to equal or exceed the uplifting force of the upwardly moving feedstock and gas through ebullated bed reactor 10 as heterogeneous catalyst 24 reaches a given level of expansion or separation. Above expanded catalyst zone 22 is an upper heterogeneous catalyst free zone 30.

Hydrocarbons and other materials within the ebullated bed reactor 10 are continuously recirculated from upper heterogeneous catalyst free zone 30 to lower heterogeneous catalyst free zone 28 by means of a recycling channel 32 positioned in the center of ebullated bed reactor 10 connected to an ebullating pump 34 at the bottom of ebullated bed reactor 10. At the top of recycling channel 32 is a funnel-shaped recycle cup 36 through which feedstock is drawn from upper heterogeneous catalyst free zone 30. The material drawn downward through recycling channel 32 enters lower catalyst free zone 28 and then passes upwardly through distributor grid plate 26 and into expanded catalyst zone 22, where it is blended with freshly added feedstock 14 and hydrogen gas 16 entering ebullated bed reactor 10 through inlet port 12. Continuously circulating blended materials upward through the ebullated bed reactor 10 advantageously maintains heterogeneous catalyst 24 in an expanded or fluidized state within expanded catalyst zone 22, minimizes channeling, controls reaction rates, and distributes heat released by exothermic hydrogenation reactions to maintain the reactor temperature at a safe level.

Fresh heterogeneous catalyst 24 can be introduced into ebullated bed reactor 10, such as into expanded catalyst zone 22, through a catalyst inlet tube 38, which passes through the top of ebullated bed reactor 10 and directly into expanded catalyst zone 22. Spent heterogeneous catalyst 24 is withdrawn from expanded catalyst zone 22 through a catalyst withdrawal tube 40 that passes from a lower end of expanded catalyst zone 22, through distributor grid plate 26 and through the bottom of ebullated bed reactor 10. It will be appreciated that the catalyst withdrawal tube 40 is unable to differentiate between fully spent catalyst, partially spent but active catalyst, and freshly added catalyst such that a random distribution of heterogeneous catalyst 24 is typically withdrawn from ebullated bed reactor 10 as "spent" catalyst.

Upgraded hydroprocessed material 20 withdrawn from ebullated bed reactor 10 can be introduced into a separator 42 (e.g., hot separator, inter-stage pressure differential separator, atmospheric distillation tower, or vacuum distillation tower). The separator 42 is configured to separate one or more volatile fractions (or distillates) 46 from a non-volatile fraction (or liquid) 48.

Figure 2B:
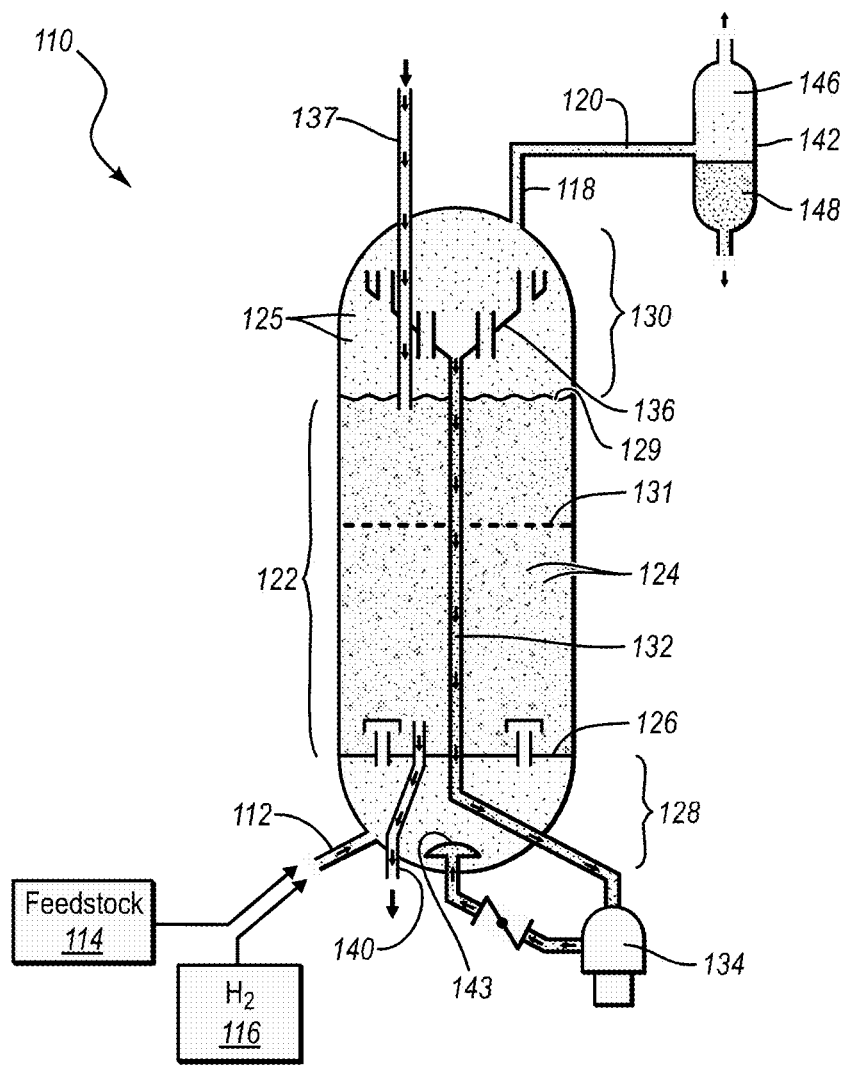

FIG. 2B schematically illustrates an ebullated bed reactor 110 used in the H-Oil hydrocracking system developed by Hydrocarbon Research Incorporated and currently licensed by Axens. Ebullated bed reactor 110 includes an inlet port 112, through which a heavy oil feedstock 114 and pressurized hydrogen gas 116 are introduced, and an outlet port 118, through which upgraded hydrocarbon material 120 is withdrawn.

An expanded catalyst zone 122 comprising a heterogeneous catalyst 124 is bounded by a distributor grid plate 126, which separates expanded catalyst zone 122 from a lower catalyst free zone 128 between the bottom of reactor 110 and distributor grid plate 126, and an upper end 129, which defines an approximate boundary between expanded catalyst zone 122 and an upper catalyst free zone 130. Dotted boundary line 131 schematically illustrates the approximate level of heterogeneous catalyst 124 when not in an expanded or fluidized state.

Hydrocarbons and other materials in the ebullated bed reactor 110 are continuously recirculated by a recycling channel 132 connected to an ebullating pump 134 positioned outside of reactor 110. Materials are drawn through a funnel-shaped recycle cup 136 from upper catalyst free zone 130. Recycle cup 136 is spiral-shaped, which helps separate hydrogen bubbles 125 from recycles material 132 to prevent cavitation in the ebullating pump 134. Recycled material 132 enters lower catalyst free zone 128, where it is blended with fresh feedstock 116 and hydrogen gas 118, and the mixture passes up through distributor grid plate 126 and into expanded catalyst zone 122. Fresh heterogeneous catalyst is introduced into expanded catalyst zone 122 through a catalyst inlet tube 137, and spent heterogeneous catalyst is withdrawn from expanded catalyst zone 122 through a catalyst discharge tube 140.

The main difference between the H-Oil ebullated bed reactor 110 and the LC-Fining ebullated bed reactor 10 is the location of the ebullating pump. Ebullating pump 134 in H-Oil reactor 110 is located external to the reaction chamber. The recirculating feedstock is introduced through a recirculation port with a distributor 143 at the bottom of reactor 110. The recirculation port with distributor 143 aids in evenly distributing materials through lower catalyst free zone 128. Upgraded material 120 is shown being sent to a separator 142, which separates one or more volatile fractions 146 from a non-volatile fraction 148.

Upgraded hydroprocessed material 120 withdrawn from outlet port 118 of ebullated bed reactor 110 can be introduced into a separator 142 (e.g., hot separator, inter-stage pressure differential separator, atmospheric distillation tower, or vacuum distillation tower). The separator 142 is configured to separate one or more volatile fractions (or distillates) 146 from a non-volatile fraction (or liquid) 148.

Figure 2C:
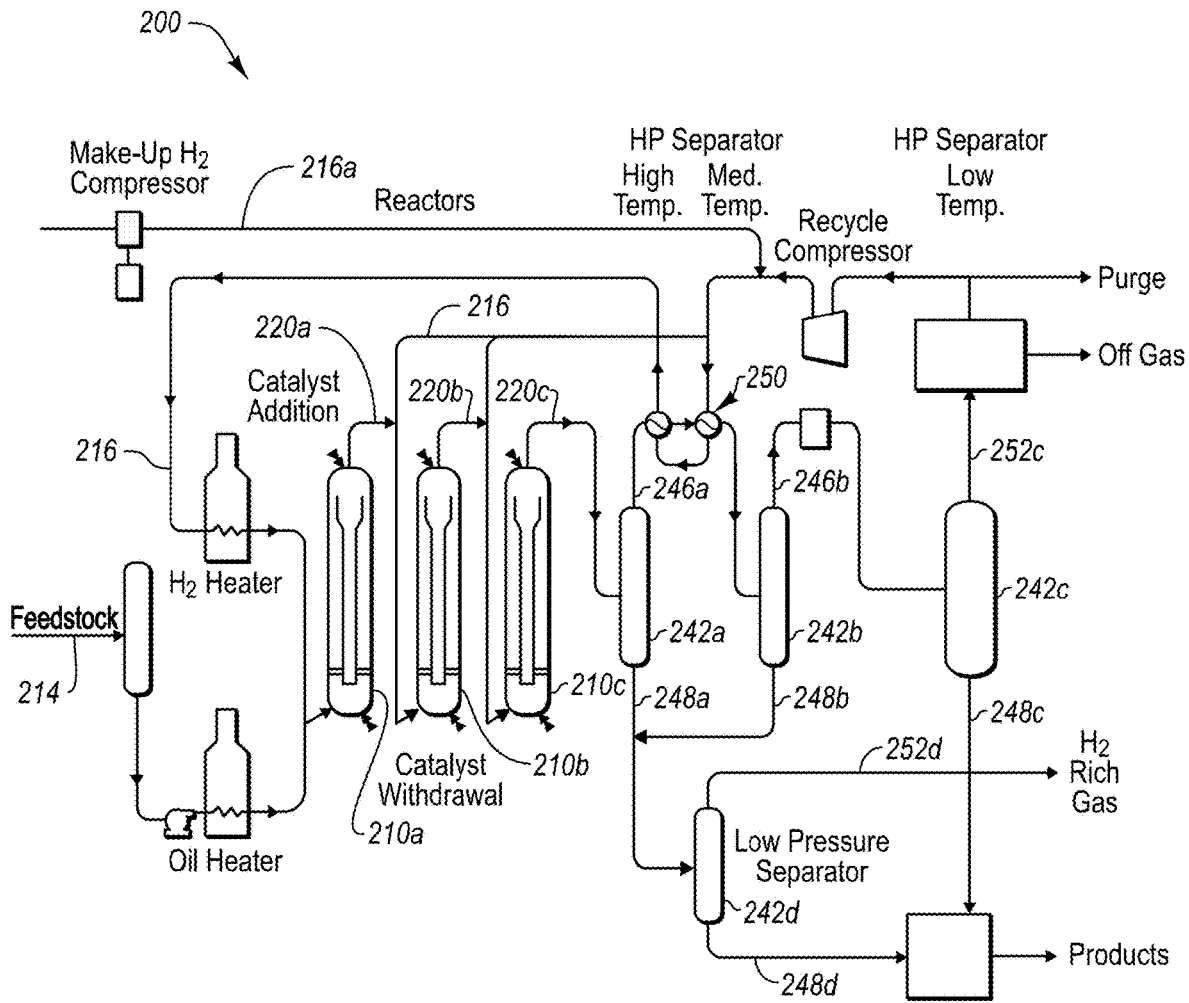
FIG. 2C schematically illustrates an exemplary ebullated bed hydroprocessing system comprising multiple ebullated bed reactors.

FIG. 2C schematically illustrates an ebullated bed hydroprocessing system 200 comprising multiple ebullated bed reactors. Hydroprocessing system 200, an example of which is an LC-Fining hydroprocessing unit, may include three ebullated bed reactors 210a, 210b, 210c in series for upgrading a feedstock 214. Feedstock 214 is introduced into a first ebullated bed reactor 210a together with hydrogen gas 216, both of which are passed through respective heaters prior to entering the reactor. Upgraded material 220a from first ebullated bed reactor 210a containing residual dispersed metal sulfide catalyst particles is introduced together with additional hydrogen gas 216 into a second ebullated bed reactor 210b. Upgraded material 220b from second ebullated bed reactor 210b containing residual dispersed metal sulfide catalyst particles is introduced together with additional hydrogen gas 216 into a third ebullated bed reactor 210c.

It should be understood that one or more interstage separators can optionally be interposed between first and second reactors 210a, 210b and/or second and third reactors 210b, 210c, in order to remove lower boiling fractions and gases from a non-volatile fraction containing liquid hydrocarbons and residual dispersed metal sulfide catalyst particles. It can be desirable to remove lower alkanes, such as hexanes and heptanes, which are valuable fuel products but poor solvents for asphaltenes. Removing volatile materials between multiple reactors enhances production of valuable products and increases the solubility of asphaltenes in the hydrocarbon liquid fraction fed to the downstream reactor(s). Both increase efficiency of the overall hydroprocessing system.

Upgraded material 220c from third ebullated bed reactor 210c containing residual dispersed metal sulfide catalyst particles is sent to a high temperature separator 242a, which separates a volatile fraction 246a from a non-volatile liquid fraction 248a. Volatile fraction 246a passes through a heat exchanger 250, which preheats hydrogen gas 216 prior to being introduced into first ebullated bed reactor 210a. The somewhat cooled volatile fraction 246a is sent to a medium temperature separator 242b, which separates a remaining volatile fraction 246b from a resulting liquid fraction 248b that forms as a result of cooling by heat exchanger 250. Remaining volatile fraction 246b is sent downstream to a low temperature separator 246c for further separation into a gaseous fraction 252c and a degassed liquid fraction 248c.

Liquid fraction 248a from high temperature separator 242a is sent together with resulting liquid fraction 248b from medium temperature separator 242b to a low pressure separator 242d, which separates a hydrogen rich gas 252d from a degassed liquid fraction 248d, which is then mixed with the degassed liquid fraction 248c from low temperature separator 242c and fractionated into products. Gaseous fraction 252c from low temperature separator 242c is purified into off gas, purge gas, and hydrogen gas 216. Hydrogen gas 216 is compressed, mixed with make-up hydrogen gas 216a, and either passed through heat exchanger 250 and introduced into first ebullated bed reactor 210a together with feedstock 216 or introduced directly into second and third ebullated bed reactors 210b and 210b.

Figure 2D:
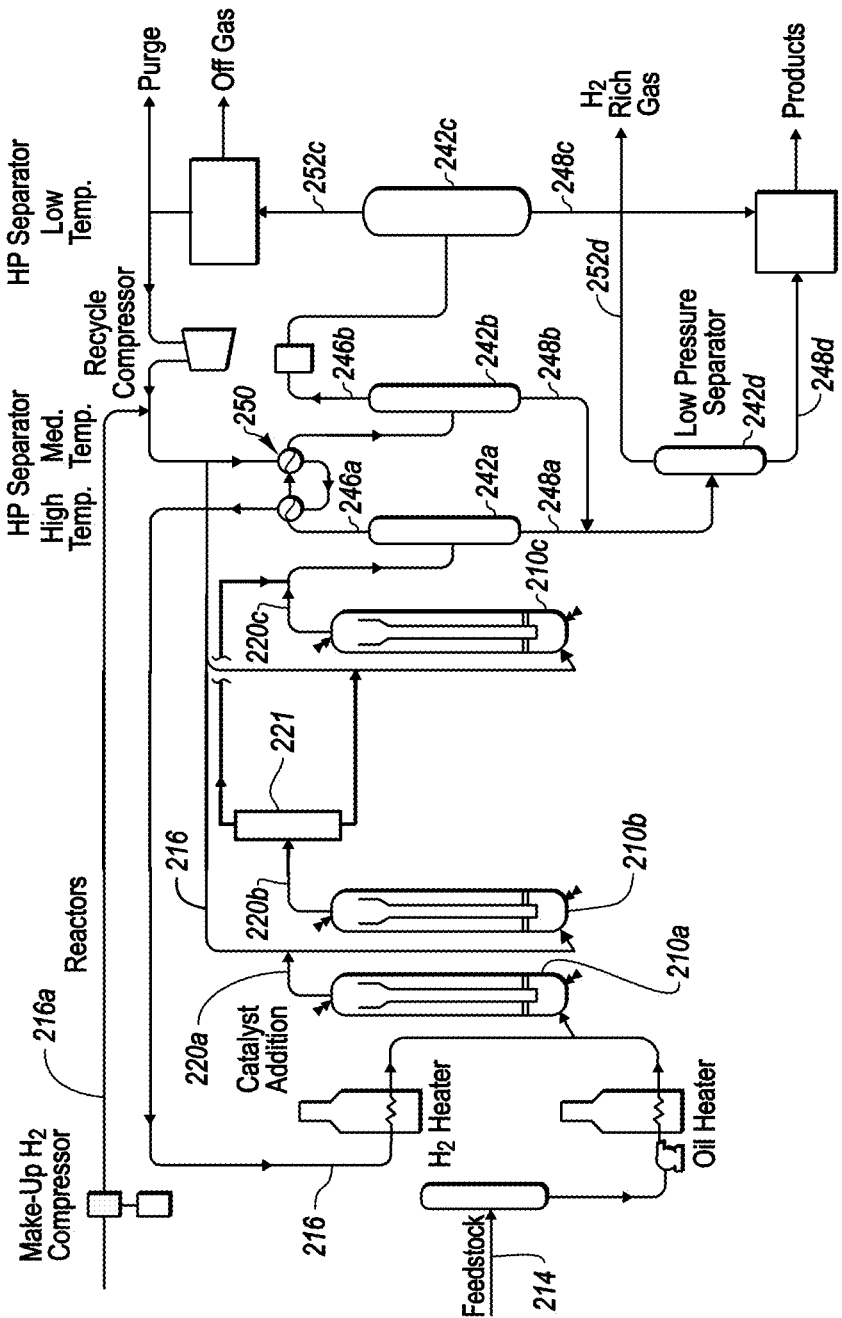
FIG. 2D schematically illustrates an exemplary ebullated bed hydroprocessing system comprising multiple ebullated bed reactors and an interstage separator between two of the reactors.

FIG. 2D schematically illustrates an ebullated bed hydroprocessing system comprising multiple ebullated bed reactors 210, similar to the system illustrated in FIG. 2C, but with an interstage separator 221 interposed between second and third ebullated bed reactors 210b, 210c (although interstage separator 221 may be interposed between first and second ebullated bed reactors 210a, 210b). As illustrated, the effluent from second ebullated bed reactor 210b enters interstage separator 221, which can be a high-pressure, high-temperature separator. The liquid fraction from separator 221 containing residual dispersed metal sulfide catalyst particles is combined with a portion of the recycle hydrogen from line 216 and then enters third-stage reactor 210c. The vapor fraction from the interstage separator 221 bypasses third-stage reactor 210c, mixes with effluent from third-stage reactor 210c, and then passes into a high-pressure, high-temperature separator 242a.

This allows lighter, more-saturated components formed in the first- and second-stage reactors to bypass third-stage reactor 210c. The benefits of this are (1) a reduced vapor load on third-stage reactor 210c, which increases the volume utilization of third-stage reactor 210c for converting the remaining heavy components, and (2) a reduced concentration of "anti-solvent" components (saturates) which can destabilize asphaltenes in third-stage reactor 210c.

In preferred embodiments, the hydroprocessing systems are configured and operated to promote hydrocracking reactions rather than less severe hydroprocessing reactions, such as hydrotreating. Hydrocracking involves the breaking of carbon-carbon molecular bonds, such as reducing the molecular weight of larger hydrocarbon molecules and/or ring opening of aromatic compounds. Hydrotreating, on the other hand, mainly involves hydrogenation of unsaturated hydrocarbons, with minimal or no breaking of carbon-carbon molecular bonds.

To promote more severe hydrocracking reactions rather than less severe hydrotreating reactions, the hydroprocessing reactor(s) are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a space velocity (LHSV) in a range of about 0.05 $hr^{-1}$ to about 0.45 $hr^{-1}$, more preferably in a range of about 0.1 $hr^{-1}$ to about 0.35 $hr^{-1}$. The difference between hydrocracking and hydrotreating can be expressed in terms of resid conversion (wherein hydrocracking results in the substantial conversion of higher boiling to lower boiling hydrocarbons, while hydrotreating does not).

The hydroprocessing systems disclosed herein can result in a resid conversion in a range of about 40% to about 90%, preferably in a range of about 55% to about 80%. The preferred conversion range typically depends on the type of feedstock because of differences in processing difficulty between different feedstocks. Typically, conversion will be at least about 5% higher, preferably at least about 10% higher, compared to operating an ebullated bed reactor prior to upgrading to utilize a dual catalyst system as disclosed herein.

III. Upgrading an Ebullated Bed Hydroprocessing Reactor

FIGS. 3A, 3B, 3C, and 3D are flow diagrams which illustrate exemplary methods for upgrading an ebullated bed reactor at selected conditions while using a dual catalyst system to produce less fouling sediment (i.e., sediment that causes a lower rate of equipment fouling at a given sediment production rate and/or concentration in a process stream).

Figure 3A:
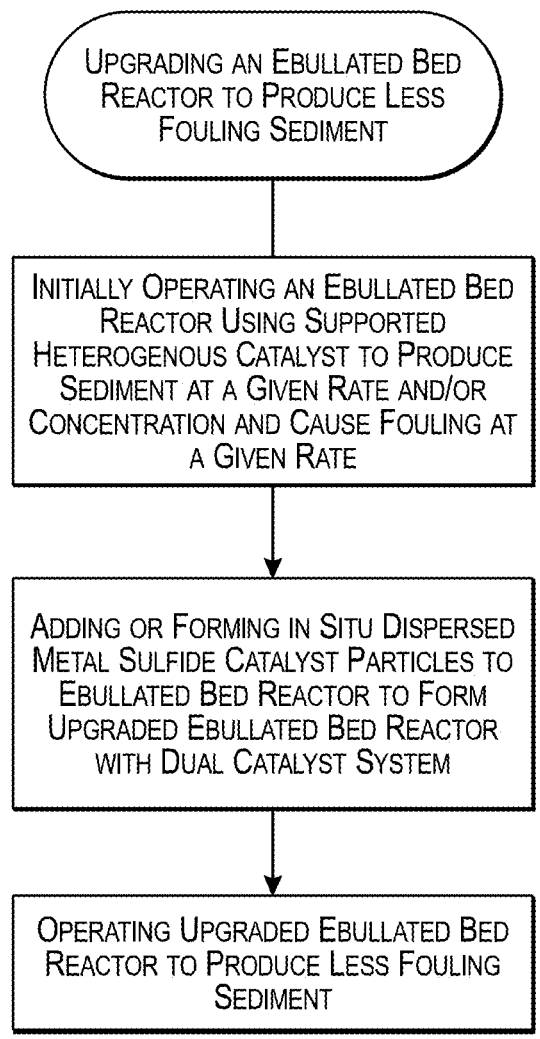
FIG. 3A is a flow diagram illustrating an exemplary method for upgrading an ebullated bed reactor to produce less fouling sediment (i.e., that reduces equipment fouling for a given sediment production rate and/or concentration in a process stream)

FIG. 3A more particularly illustrates a method comprising: (A) initially operating an ebullated bed reactor using a heterogeneous catalyst to hydroprocess heavy oil at initial conditions and produce sediment and cause fouling at a given rate; (B) adding or forming in situ dispersed metal sulfide catalyst particles to the ebullated bed reactor to form an upgraded reactor with a dual catalyst system; and (C) operating the upgraded ebullated bed reactor at modified conditions using the dual catalyst system to produce less fouling sediment compared to sediment formed when initially operating the ebullated bed reactor.

According to some embodiments, the heterogeneous catalyst utilized when initially operating the ebullated bed reactor at initial conditions is a commercially available catalyst typically used in ebullated bed reactor systems. To maximize efficiency, the initial reactor conditions are advantageously at a level at which sediment formation and equipment fouling are maintained within acceptable levels. Increasing sediment formation (absolute production rate and/or increased wt % of sediment in at least one process stream), without upgrading the ebullated reactor to operate at modified conditions using a dual catalyst system, results in increased equipment fouling, which require more frequent shutdown and cleaning of the hydroprocessing reactor and related equipment, such as pipes, towers, heaters, heat exchangers, heterogeneous catalyst and/or separation equipment.

In order to produce less fouling sediment, such as by increasing the rate of production of converted products and/or sediment production rate and/or sediment concentration in at least one process stream (e.g., by increasing reactor severity and/or rate of production of converted products) without increasing equipment fouling and the need for more frequent shutdown and maintenance, the ebullated bed reactor is upgraded to operate at modified conditions using a dual catalyst system comprising a heterogeneous catalyst and dispersed metal sulfide catalyst particles. Operating the upgraded ebullated bed reactor to produce less fouling sediment may involve operating with increased conversion and/or increased throughput than when operating at the initial conditions. Both typically involve operating the upgraded reactor at an increased temperature and increase sediment production and rate of equipment fouling. However, producing less fouling sediment results in less equipment fouling and lower frequency of shutdowns and cleaning when sediment is produced at a given rate or wt % in a process stream.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial production rate of converted products, an initial sediment production rate and/or concentration in a process stream, and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor at modified conditions using the dual catalyst system to produce less fouling sediment, resulting in less equipment fouling at a given sediment production rate and/or concentration compared to when operating the ebullated bed reactor at the initial conditions.

In one implementation, operating the upgraded ebullated bed reactor at modified conditions using the dual catalyst system to produce less fouling sediment comprises: (i) operating at conditions that produce converted products at the same or similar rate as the initial production rate of converted products when operating at the initial conditions; (ii) the conditions reducing the sediment production rate and/or concentration in the process stream by a certain percentage compared to the initial sediment production rate and/or concentration when operating at the initial conditions; and (iii) equipment fouling occurring at a reduced rate compared to the initial rate of equipment fouling when operating at the initial conditions, and wherein the rate of equipment fouling is reduced by an even greater percentage than the percent reduction in sediment production rate and/or concentration.

In another implementation, operating the upgraded ebullated bed reactor at modified conditions using the dual catalyst system to produce less fouling sediment comprises: (i) operating at conditions that produce converted products at a higher rate than the initial production rate of converted products when operating at the initial conditions; (ii) the conditions producing sediment in the process stream at the same or similar rate and/or concentration as the initial sediment production rate and/or concentration when operating at the initial conditions; and (iii) equipment fouling occurring at a reduced rate compared to the initial rate of equipment fouling when operating at the initial conditions.

In yet another implementation, operating the upgraded ebullated bed reactor at modified conditions using the dual catalyst system to produce less fouling sediment comprises: (i) operating at conditions that produce converted products at a higher rate than the initial production rate of converted products when operating at the initial conditions; (ii) the conditions producing sediment in the process stream at a higher rate and/or concentration than when operating at the initial conditions; and (iii) equipment fouling occurring at a rate that is no higher than the initial rate of equipment fouling when operating at the initial conditions.

In one implementation, the production rate of converted products is increased, when operating the upgraded ebullated bed reactor at modified conditions using the dual catalyst system, by at least one of: (i) higher temperature and higher conversion at same or similar throughput as when operating at the initial conditions; (ii) higher temperature and higher throughput at same or similar conversion as when operating at the initial conditions; or (iii) higher temperature, higher throughput, and higher conversion than when operating at the initial conditions.

In some embodiments, the production rate of converted products can be increased by increasing throughput by at least 2.5%, at least 5%, at least 10%, or at least 20% when operating the upgraded ebullated bed reactor than when operating at the initial conditions. In some embodiments, the production rate of converted products can be increased by increasing conversion by at least 2.5%, at least 5%, at least 7.5%, at least 10%, or at least 15% when operating the upgraded ebullated bed reactor than when operating at the initial conditions. In some embodiments, the production rate of converted products can be increased by increasing temperature by at least 2.5° C., at least 5° C., at least 7.5° C., or at least 10° C. when operating the upgraded ebullated bed reactor than when operating at the initial conditions.

In some embodiments, after upgrading the ebullated bed reactor to operate at modified conditions and using the dual catalyst system, the sediment production rate and/or concentration in a process stream is maintained or increased compared to the initial sediment production rate and/or concentration, and the rate of equipment fouling is decreased by at least 5%, 25%, 50%, or 75% compared to the initial rate of equipment fouling when operating the ebullated bed reactor at the initial conditions.

In some embodiments, after upgrading the ebullated bed reactor to operate at modified conditions and using the dual catalyst system, the sediment production rate is increased by at least 2%, 10%, 20%, or 33% compared to the initial sediment production rate, and the rate of equipment fouling is maintained or decreased compared to the initial rate of equipment fouling when operating the ebullated bed reactor at the initial conditions.

In some embodiments, after upgrading the ebullated bed reactor to operate at modified conditions and using the dual catalyst system, the sediment concentration in a process stream is increased by at least 2%, 10%, 20%, or 33% compared to the initial sediment concentration, and the rate of equipment fouling is maintained or decreased compared to the initial rate of equipment fouling when operating the ebullated bed reactor at the initial conditions.

In some embodiments, after upgrading the ebullated bed reactor to operate at modified conditions and using the dual catalyst system, the sediment production rate is reduced by at least 2%, 10%, 30%, or 50% compared to the initial sediment production rate, and the rate of equipment fouling is reduced by an even greater percentage than the percent reduction in the sediment production rate compared to the initial rate of equipment fouling, when operating the ebullated bed reactor at the initial conditions.

In some embodiments, after upgrading the ebullated bed reactor to operate at modified conditions and using the dual catalyst system, the sediment concentration in the process stream is reduced by at least 2%, 10%, 30%, or 50% compared to the initial sediment concentration in the process stream, and the rate of equipment fouling is reduced by an even greater percentage than the percent reduction in the sediment concentration compared to the initial rate of equipment fouling, when operating the ebullated bed reactor at the initial conditions.

In view of the foregoing, it can be seen that, for a given sediment production rate and/or concentration in the process stream, the rate of equipment fouling can be reduced by at least about 5%, 10%, 15%, 20%, 25%, 30%, 40%, 50%, 60%, or 75%, when operating the upgraded ebullated bed reactor at the modified conditions while using the dual catalyst system, compared to the rate of equipment fouling for the given sediment production rate and/or concentration in the process stream when operating the ebullated bed reactor at the initial conditions.

When comparing the rate of equipment fouling to the sediment production rate and/or concentration before and after upgrading the ebullated bed reactor to produce a lower quantity of sediment, the decrease in equipment fouling has been shown to be about 3 times to about 20 times greater than the decrease in sediment quantity (see examples below). This correlates with sediment being about 3 to 20 times less fouling than the baseline sediment when upgrading the ebullated bed reactor according to the invention.

Figure 3B:
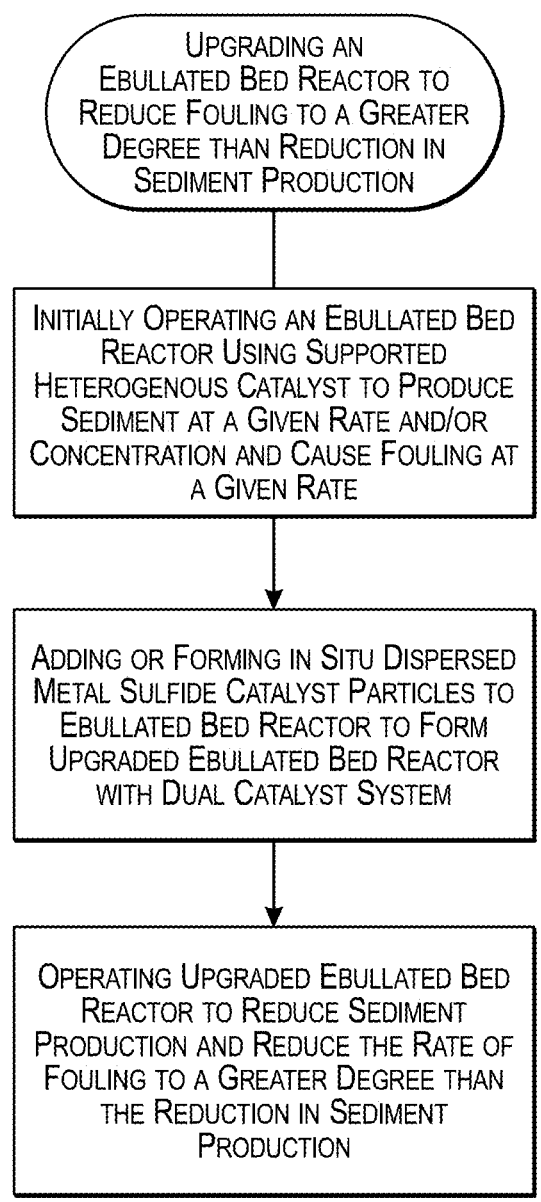
FIG. 3B is a flow diagram illustrating an exemplary method for upgrading an ebullated bed reactor to reduce the rate of equipment fouling by a greater degree or percentage than the percent reduction in the sediment production rate and/or concentration in a process stream.

FIG. 3B is a flow diagram illustrating an exemplary method for upgrading an ebullated bed reactor to reduce equipment fouling by a greater degree or percentage than the percent reduction in sediment production, which is an embodiment of the method illustrated in FIG. 3A. FIG. 3B more particularly illustrates a method comprising: (A) initially operating an ebullated bed reactor using a heterogeneous catalyst to hydroprocess heavy oil at initial conditions to produce sediment at a given rate or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor at modified conditions using the dual catalyst system to reduce sediment production rate and/or concentration by a certain percentage and reduce the rate of equipment fouling by a greater percentage than the percent reduction in sediment production rate or concentration.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial sediment production rate and/or concentration in a process stream and an initial rate of equipment fouling; (2) thereafter upgrading the ebullated bed reactor to operate at modified conditions using a dual catalyst system comprised of dispersed metal sulfide catalyst particles and heterogeneous catalyst; and (3) operating the upgraded ebullated bed reactor at modified conditions using the dual catalyst system to reduce sediment production rate and/or concentration by a certain percentage and reduce the rate of equipment fouling by a greater percentage than the percent reduction in sediment production rate and/or concentration. In some embodiments, operating the upgraded ebullated bed reactor includes reducing the sediment production rate and/or concentration in a process stream by at least at least 2%, 10%, 30%, or 50% compared to the initial sediment production rate and/or concentration and reducing the rate of equipment fouling by an even greater percentage, such as by at least 5%, 25%, 50%, or 75%, compared to the initial rate of equipment fouling.

Figure 3C:
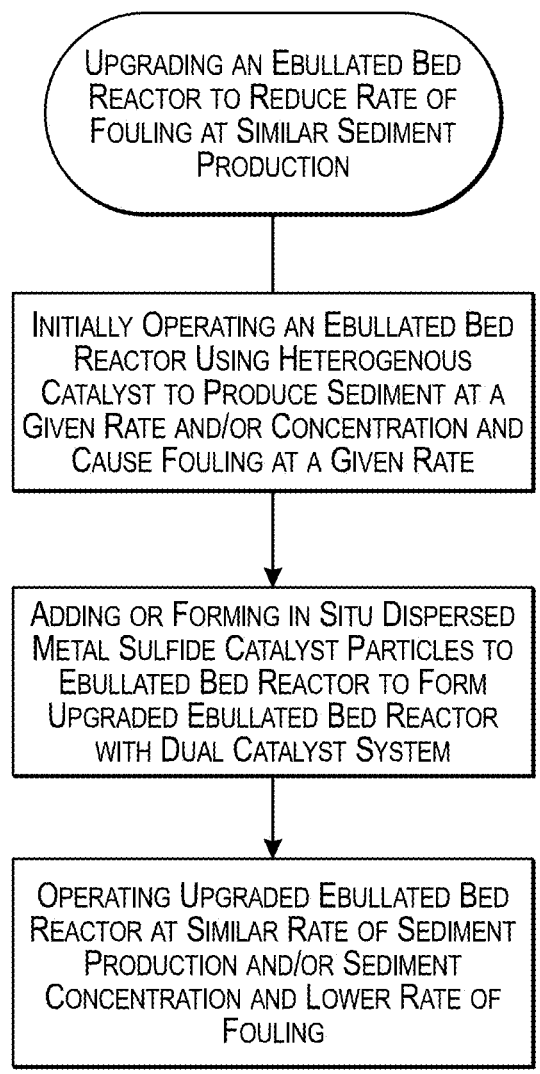
FIG. 3C is a flow diagram illustrating an exemplary method for upgrading an ebullated bed reactor to reduce the rate of equipment fouling even when producing sediment at similar production rate and/or concentration in a process stream.

FIG. 3C is a flow diagram illustrating an exemplary method for upgrading an ebullated bed reactor to reduce equipment fouling at similar sediment production, which is an embodiment of the method illustrated in FIG. 3A. FIG. 3C more particularly illustrates a method comprising: (A) initially operating an ebullated bed reactor using a heterogeneous catalyst to hydroprocess heavy oil at initial conditions to produce sediment at a given rate and/or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor at modified conditions using the dual catalyst system to maintain sediment production rate and/or concentration and reduce the rate of equipment fouling.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial sediment production rate and/or concentration in a process stream and an initial rate of equipment fouling; (2) thereafter upgrading the ebullated bed reactor to operate at modified conditions using a dual catalyst system comprised of dispersed metal sulfide catalyst particles and heterogeneous catalyst; and (3) operating the upgraded ebullated bed reactor at modified conditions using the dual catalyst system to maintain the same or similar sediment production rate and/or concentration and at a reduced rate of equipment fouling than when operating the ebullated bed reactor at the initial conditions. In some embodiments, operating the upgraded ebullated bed reactor includes reducing the rate of equipment fouling by at least 5%, 25%, 50%, or 75% compared to the initial rate of equipment fouling without reducing sediment production rate and/or concentration.

Figure 3D:
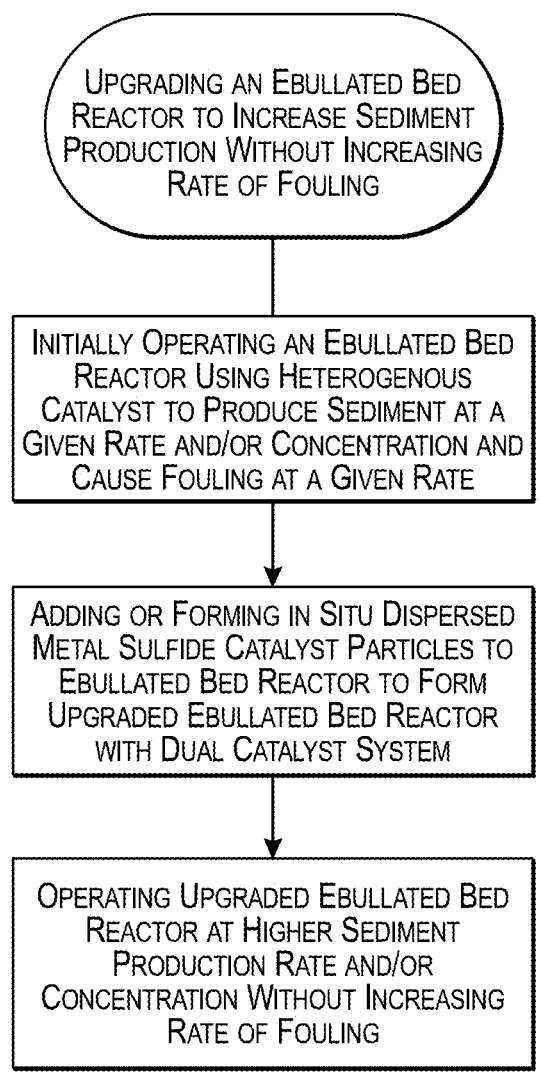
FIG. 3D is a flow diagram illustrating an exemplary method for upgrading an ebullated bed reactor to increase the sediment production rate and/or sediment concentration in a process stream without increasing the rate of equipment fouling.

FIG. 3D is a flow diagram illustrating an exemplary method for upgrading an ebullated bed reactor to increase sediment production without increasing the rate of equipment fouling, which is an embodiment of the method illustrated in FIG. 3A. FIG. 3D more particularly illustrates a method comprising: (A) initially operating an ebullated bed reactor using a heterogeneous catalyst to hydroprocess heavy oil at initial conditions to produce sediment at a given rate and/or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor at modified conditions using the dual catalyst system to increase sediment production rate and/or concentration, but without increasing the rate of equipment fouling.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including producing sediment at an initial production rate and/or concentration in a process stream and at an initial rate of equipment fouling; (2) thereafter upgrading the ebullated bed reactor to operate at modified conditions using a dual catalyst system comprised of dispersed metal sulfide catalyst particles and heterogeneous catalyst; and (3) operating the upgraded ebullated bed reactor at modified conditions using the dual catalyst system to increase the sediment production rate and/or concentration while maintaining or reducing the rate of equipment fouling than when operating the ebullated bed reactor at the initial conditions. In some embodiments, operating the upgraded the ebullated bed reactor includes increasing the sediment production rate and/or concentration of sediment in a process stream by at least 2%, 10%, 20%, or 33% compared to the initial sediment production rate and/or concentration, but without increasing (and in some cases reducing) the rate of equipment fouling than when operating the ebullated bed reactor at the initial conditions.

The dispersed metal sulfide catalyst particles can be generated separately and then added to the ebullated bed reactor when forming the dual catalyst system. Alternatively, or in addition, at least a portion of the dispersed metal sulfide catalyst particles can be generated in situ within the ebullated bed reactor.

In some embodiments, the dispersed metal sulfide catalyst particles are advantageously formed in situ within an entirety of a heavy oil feedstock. This can be accomplished by initially mixing a catalyst precursor with the entirety of the heavy oil feedstock to form a conditioned feedstock and thereafter heating the conditioned feedstock to decompose the catalyst precursor and cause or allow catalyst metal to react with sulfur and/or sulfur-containing molecules in and/or added to the heavy oil to form the dispersed metal sulfide catalyst particles in situ.

The catalyst precursor can be oil soluble and have a decomposition temperature in a range from about 100° C.

(212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One of skill in the art can, following the present disclosure, select a mixing temperature profile that results in intimate mixing of a selected precursor composition without substantial decomposition prior to formation of the dispersed metal sulfide catalyst particles in situ.

Example catalyst precursors include, but are not limited to, molybdenum 2-ethylhexanoate, molybdenum octoate, molybdenum naphthanate, vanadium naphthanate, vanadium octoate, molybdenum hexacarbonyl, vanadium hexacarbonyl, and iron pentacarbonyl. Other catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. By way of example, each carboxylate anion may have between 8 and 17 carbon atoms or between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In other embodiments, carboxylate anions suitable for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability.

Catalyst precursors with higher thermal stability can have a first decomposition temperature higher than 210° C., higher than about 225° C., higher than about 230° C., higher than about 240° C., higher than about 275° C., or higher than about 290° C. Such catalyst precursors can have a peak decomposition temperature higher than 250° C., or higher than about 260° C., or higher than about 270° C., or higher than about 280° C., or higher than about 290° C., or higher than about 330° C.

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al., which is incorporated by reference in its entirety, describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive. To ensure thorough mixing of the catalyst precursor within the heavy oil prior to heating to form the active catalyst, a series of mixing steps are performed by different mixing apparatus prior to heating the conditioned feedstock. These may include one or more low shear in-line mixers, followed by one or more high shear mixers, followed by a surge vessel and pump-around system, followed by one or more multi-stage high pressure pumps used to pressurize the feed stream prior to introducing it into a hydroprocessing reactor.

In some embodiments, the conditioned feedstock is preheated using a heating apparatus prior to entering the hydroprocessing reactor in order to form at least a portion of the dispersed metal sulfide catalyst particles in situ within the heavy oil before entering the reactor. In other embodiments, the conditioned feedstock can be heated or further heated in the hydroprocessing reactor in order to form at least a portion of the dispersed metal sulfide catalyst particles in situ within the heavy oil.

In some embodiments, the dispersed metal sulfide catalyst particles can be formed in a multi-step process. For example, an oil-soluble catalyst precursor composition can be premixed with a hydrocarbon diluent to form a diluted precursor mixture. Examples of suitable hydrocarbon diluents include, but are not limited to, vacuum gas oil (which typically has a nominal boiling range of 360-524° C.) (680-975° F.), decant oil or cycle oil (which typically has a nominal boiling range of 360°-550° C.) (680-1022° F.), and atmospheric gas oil (which typically has a nominal boiling range of 200°–360° C.) (392-680° F.), a portion of the heavy oil or deasphalted oil feedstock, and other hydrocarbons that nominally boil at a temperature higher than about 200° C.

The ratio of catalyst precursor to hydrocarbon oil diluent used to make the diluted precursor mixture can be in a range of about 1:500 to about 1:1, or in a range of about 1:150 to about 1:2, or in a range of about 1:100 to about 1:5 (e.g., 1:100, 1:50, 1:30, or 1:10). The amount of catalyst metal (e.g., molybdenum) in the diluted precursor mixture is preferably in a range of about 100 ppm to about 7000 ppm by weight of the diluted precursor mixture, more preferably in a range of about 300 ppm to about 4000 ppm by weight of the diluted precursor mixture.

The catalyst precursor is advantageously mixed with the hydrocarbon diluent below a temperature at which a significant portion of the catalyst precursor decomposes. The mixing may be performed at temperature in a range of about 25° C. (77° F.) to about 250° C. (482° F.), or in range of about 50° C. (122° F.) to about 200° C. (392° F.), or in a range of about 75° C. (167° F.) to about 150° C. (302° F.), to form the diluted precursor mixture. The temperature at which the diluted precursor mixture is formed may depend on the decomposition temperature and/or other characteristics of the catalyst precursor that is utilized and/or characteristics of the hydrocarbon diluent, such as viscosity.

The catalyst precursor is preferably mixed with the hydrocarbon oil diluent for a time period in a range of about 0.1 second to about 5 minutes, or in a range of about 0.5 second to about 3 minutes, or in a range of about 1 second to about 1 minute. The actual mixing time is dependent, at least in part, on the temperature (i.e., which affects the viscosity of the fluids) and mixing intensity. Mixing intensity is dependent, at least in part, on the number of stages e.g., for an in-line static mixer.

Pre-blending the catalyst precursor with a hydrocarbon diluent to form a diluted precursor mixture which is then blended with the heavy oil feedstock greatly aids in thoroughly and intimately blending the catalyst precursor within the feedstock, particularly in the relatively short period of time required for large-scale industrial operations. Forming a diluted precursor mixture shortens the overall mixing time by (1) reducing or eliminating differences in solubility between a more polar catalyst precursor and a more hydrophobic heavy oil feedstock, (2) reducing or eliminating differences in rheology between the catalyst precursor and heavy oil feedstock, and/or (3) breaking up catalyst precursor molecules to form a solute within the hydrocarbon diluent that is more easily dispersed within the heavy oil feedstock.

The diluted precursor mixture is then combined with the heavy oil feedstock and mixed for a time sufficient and in a manner so as to disperse the catalyst precursor throughout the feedstock to form a conditioned feedstock in which the catalyst precursor is thoroughly mixed within the heavy oil prior to thermal decomposition and formation of the active metal sulfide catalyst particles. In order to obtain sufficient mixing of the catalyst precursor within the heavy oil feedstock, the diluted precursor mixture and heavy oil feedstock are advantageously mixed for a time period in a range of about 0.1 second to about 5 minutes, or in a range from about 0.5 second to about 3 minutes, or in a range of about 1 second to about 3 minutes. Increasing the vigorousness and/or shearing energy of the mixing process generally reduce the time required to effect thorough mixing.

Examples of mixing apparatus that can be used to effect thorough mixing of the catalyst precursor and/or diluted precursor mixture with heavy oil include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers followed by a surge vessel; combinations of the above followed by one or more multi-stage centrifugal pumps; and one or more multi-stage centrifugal pumps. According to some embodiments, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor is mixed with the hydrocarbon diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock. In general, decreasing the viscosity of the heavy oil feedstock will reduce the time required to effect thorough and intimate mixing of the oil soluble precursor composition within the feedstock. However, it can also cause premature decomposition of the catalyst precursor. One can select a catalyst precursor having a decomposition temperature suitable for a given heavy oil feedstock.

The heavy oil feedstock and catalyst precursor and/or diluted precursor mixture are advantageously mixed at a temperature in a range of about 25° C. (77° F.) to about 350° C. (662° F.), or in a range of about 50° C. (122° F.) to about 300° C. (572° F.), or in a range of about 75° C. (167° F.) to about 250° C. (482° F.) to yield a conditioned feedstock.

In the case where the catalyst precursor is mixed directly with the heavy oil feedstock without first forming a diluted precursor mixture, it may be advantageous to mix the catalyst precursor and feedstock for a time period in a range of about 0.2 second to about 10 minutes, or in a range from about 1 second to about 6 minutes, or in a range of about 2 seconds to about 2 minutes. It may also be advantageous to mix the catalyst precursor and heavy oil feedstock below a temperature at which a significant portion of the catalyst precursor composition decomposes.

In the case where the catalyst precursor is premixed with a hydrocarbon diluent to form a diluted precursor mixture, which is thereafter mixed with the heavy oil feedstock, it may be permissible for the heavy oil feedstock to be at or above the decomposition temperature of the catalyst precursor. In some cases, the hydrocarbon diluent shields the individual catalyst precursor molecules and prevents them from agglomerating to form larger particles, temporarily insulates the catalyst precursor molecules from heat from the heavy oil during mixing, and facilitates dispersion of the catalyst precursor molecules sufficiently quickly throughout the heavy oil feedstock before decomposing to liberate metal. In addition, additional heating of the feedstock may be necessary to liberate hydrogen sulfide from sulfur-bearing molecules in the heavy oil to form the metal sulfide catalyst particles. In this way, progressive dilution of the catalyst precursor permits a high level of dispersion within the heavy oil feedstock, resulting in the formation of highly dispersed metal sulfide catalyst particles, even where the feedstock is at a temperature above the decomposition temperature of the catalyst precursor.

After the catalyst precursor has been well-mixed throughout the heavy oil to yield a conditioned feedstock, this composition is then heated to cause decomposition of the catalyst precursor to liberate catalyst metal therefrom, cause or allow it to react with sulfur within and/or added to the heavy oil and form the active metal sulfide catalyst particles. Metal from the catalyst precursor may initially form a metal oxide, which then reacts with sulfur in the heavy oil to yield a metal sulfide compound that forms the final active catalyst. In the case where the heavy oil feedstock includes sufficient or excess sulfur, the final activated catalyst may be formed in situ by heating the heavy oil feedstock to a temperature sufficient to liberate sulfur therefrom. In some cases, sulfur may be liberated at the same temperature that the precursor composition decomposes. In other cases, further heating to a higher temperature may be required. Hydrogen sulfide gas can be added to heavy oil that lacks sufficient sulfur to form active metal sulfide catalyst particles.

If the catalyst precursor is thoroughly mixed throughout the heavy oil, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the catalyst precursor throughout the feedstock prior to thermal decomposition of the catalyst precursor may yield individual catalyst molecules rather than colloidal particles. Simply blending, while failing to sufficiently mix, the catalyst precursor with the feedstock typically causes formation of large, agglomerated metal sulfide compounds that are micron-sized or larger.

In order to form dispersed metal sulfide catalyst particles, the conditioned feedstock is heated to a temperature in a range of about 275° C. (527° F.) to about 450° C. (842° F.), or in a range of about 310° C. (590° F.) to about 430° C. (806° F.), or in a range of about 330° C. (626° F.) to about 410° C. (770° F.).

The initial concentration of catalyst metal provided by dispersed metal sulfide catalyst particles can be in a range of about 1 ppm to about 500 ppm by weight of the heavy oil feedstock, or in a range of about 5 ppm to about 300 ppm, or in a range of about 10 ppm to about 100 ppm. The catalyst may become more concentrated as volatile fractions are removed from a resid fraction being hydroprocessed. Recycling of separator bottoms can provide supplemental dispersed metal sulfide catalyst particles, which can maintain a desired concentration in the ebullated bed reactor with decreased use of catalyst precursor, or it can increase the concentration of dispersed metal sulfide catalyst particles that can assist in hydroprocessing the additional asphaltenes provided by the recycled separator bottoms.

In the case where the heavy oil feedstock includes a significant quantity of asphaltene molecules, the dispersed metal sulfide catalyst particles may preferentially associate with or remain in close proximity to the asphaltene molecules. Asphaltene molecules can have a greater affinity for the metal sulfide catalyst particles since asphaltene molecules are generally more hydrophilic and less hydrophobic than other hydrocarbons contained within heavy oil. Because the metal sulfide catalyst particles tend to be hydrophilic, the individual particles or molecules will tend to migrate toward more hydrophilic moieties or molecules within the heavy oil feedstock.

While the highly polar nature of metal sulfide catalyst particles causes or allows them to associate with asphaltene molecules, it is the general incompatibility between the highly polar catalyst compounds and hydrophobic heavy oil that necessitates the aforementioned intimate or thorough mixing of catalyst precursor composition within the heavy oil prior to decomposition and formation of the active catalyst particles. Because metal catalyst compounds are highly polar, they cannot be effectively dispersed within heavy oil if added directly thereto. In practical terms, forming smaller active catalyst particles results in a greater number of catalyst particles that provide more evenly distributed catalyst sites throughout the heavy oil. It also increases catalyst surface area.

IV. Upgraded Ebullated Bed Reactor

Figure 4:
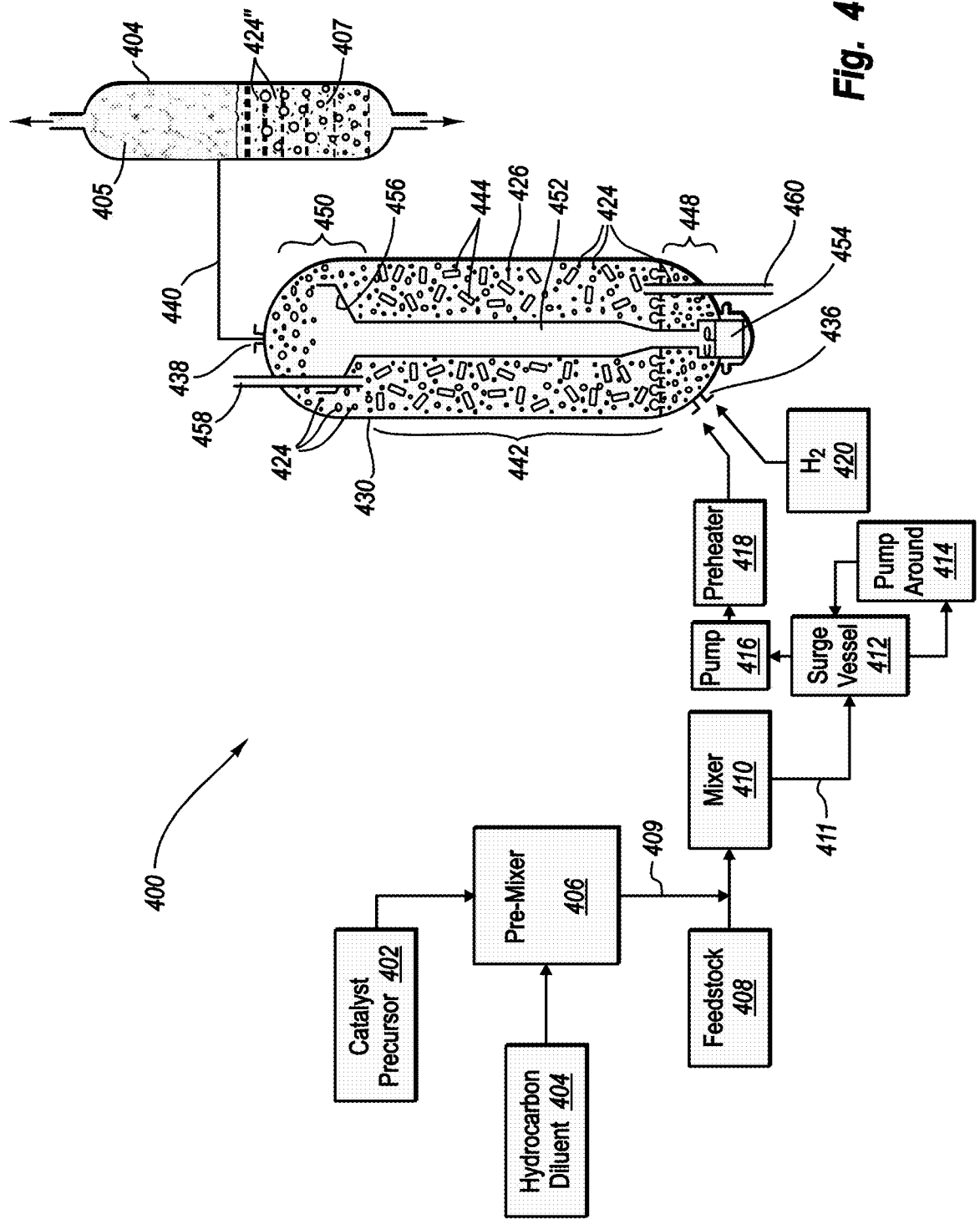
FIG. 4 schematically illustrates an exemplary ebullated bed hydroprocessing system that can be operating at modified conditions using a dual catalyst system to produce less fouling sediment (i.e., sediment that causes less equipment fouling at a given concentration and/or production rate)

FIG. 4 schematically illustrates an example upgraded ebullated bed hydroprocessing system 400 that can be used in the disclosed methods and systems to produce less fouling sediment (i.e., sediment that causes less equipment fouling at a given sediment production rate and/or concentration in a process stream). Ebullated bed hydroprocessing system 400 includes an upgraded ebullated bed reactor 430 and a hot separator 404 (or other separator, such as a distillation tower).

To create upgraded ebullated bed reactor 430, a catalyst precursor 402 is pre-blended with a hydrocarbon diluent 404 in one or more pre-mixers 406 to form a catalyst precursor mixture 409. Catalyst precursor mixture 409 is added to feedstock 408 and blended with the feedstock in one or more mixers 410 to form a conditioned feedstock 411. Conditioned feedstock 411 is fed to a surge vessel 412 with a pump around 414 to cause further mixing and dispersion of the catalyst precursor within the conditioned feedstock.

The conditioned feedstock from surge vessel 412 is pressurized by one or more pumps 416, passed through a pre-heater 418, and fed into ebullated bed reactor 430 together with pressurized hydrogen gas 420 through an inlet port 436 located at or near the bottom of ebullated bed reactor 430. Hydrocarbon material 426 in ebullated bed reactor 430 contains dispersed metal sulfide catalyst particles, schematically depicted as catalyst particles 424.

Ebullated bed reactor 430 further includes an expanded catalyst zone 442 comprising a heterogeneous catalyst 444. A lower heterogeneous catalyst free zone 448 is located below expanded catalyst zone 442, and an upper heterogeneous catalyst free zone 450 is located above expanded catalyst zone 442. Dispersed metal sulfide catalyst particles 424 are dispersed throughout hydrocarbon material 426 within ebullated bed reactor 430, including expanded catalyst zone 442, heterogeneous catalyst free zones 448, 450, and recycle channel 452, thereby being available to promote upgrading reactions within what constituted catalyst free zones in the ebullated bed reactor prior to being upgraded to include the dual catalyst system.

To promote hydrocracking rather than low severity hydrotreating reactions, the hydroprocessing reactor(s) are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a space velocity (LHSV) in a range of about 0.05 $hr^{-1}$ to about 0.45 $hr^{-1}$, more preferably in a range of about 0.15 $hr^{-1}$ to about 0.35 $hr^{-1}$. The difference between hydrocracking and hydrotreating can be expressed in terms of resid conversion (wherein hydrocracking results in the substantial conversion of higher boiling to lower boiling hydrocarbons, while hydrotreating does not).

The hydroprocessing systems disclosed herein can result in a resid conversion in a range of about 40% to about 95%, or in a range of about 40% to about 90%, preferably in a range of about 55% to about 90%, or in a range of about 55 to about 80%. The preferred conversion range typically depends on the type of feedstock because of differences in processing difficulty between different feedstocks. Typically, conversion will be at least about 5% higher, preferably at least about 10% higher, compared to operating an ebullated bed reactor prior to upgrading to utilize a dual catalyst system as disclosed herein.

Material 426 in ebullated bed reactor 430 is continuously recirculated from upper heterogeneous catalyst free zone 450 to lower heterogeneous catalyst free zone 448 through a recycling channel 452 connected to an ebullating pump 454. At the top of recycling channel 452 is a funnel-shaped recycle cup 456 through which material 426 is drawn from upper heterogeneous catalyst free zone 450. Recycled material 426 is blended with fresh conditioned feedstock 411 and hydrogen gas 420.

Fresh heterogeneous catalyst 444 is introduced into ebullated bed reactor 430 through a catalyst inlet tube 458, and spent heterogeneous catalyst 444 is withdrawn through a catalyst withdrawal tube 460. Whereas the catalyst withdrawal tube 460 is unable to differentiate between fully spent catalyst, partially spent but active catalyst, and fresh catalyst, the use of dispersed metal sulfide catalyst particles 424 provides additional catalytic activity within expanded catalyst zone 442, lower and upper heterogeneous catalyst free zones 448, 450, and recycle channel 452. The addition of hydrogen to hydrocarbons outside of heterogeneous catalyst 444 minimizes formation of sediment and coke precursors, which are often responsible for deactivating the heterogeneous catalyst.

Ebullated bed reactor 430 further includes an outlet port 438 at or near the top through which converted material 440 is withdrawn. Converted material 440 is introduced into a hot separator or distillation tower 404. Hot separator or distillation tower 404 separates one or more volatile fractions 405, which is/are withdrawn from the top of hot separator 404, from a resid fraction 407, which is withdrawn from a bottom of hot separator or distillation tower 404. Resid fraction 407 contains residual metal sulfide catalyst particles, schematically depicted as catalyst particles 424. If desired, at least a portion of resid fraction 407 can be recycled back to ebullated bed reactor 430 in order to form part of the feed material and to supply an additional quantity of dispersed metal sulfide catalyst particles. Alternatively, resid fraction 407 can be further processed using downstream processing equipment, such as another ebullated bed reactor. In that case, separator 404 can be an interstage separator.

In some embodiments, operating the upgraded ebullated bed reactor at modified conditions while using the dual catalyst system to produce less fouling sediment results in a lower rate of equipment fouling at any given sediment production rate and/or concentration.

For example, the rate of equipment fouling when operating the upgraded ebullated bed reactor using the dual catalyst system to produce less fouling sediment may result in a frequency of heat exchanger shutdowns for cleanout that is less than when initially operating the ebullated bed reactor at any given sediment production rate and/or concentration.

In addition, or alternatively, the rate of equipment fouling when operating the upgraded ebullated bed reactor using the dual catalyst system to produce less fouling sediment may result in a frequency of atmospheric and/or vacuum distillation tower shutdowns for cleanout that is less than when initially operating the ebullated bed reactor at any given sediment production rate and/or concentration.

In addition, or alternatively, the rate of equipment fouling when operating of the upgraded ebullated bed reactor using the dual catalyst system to produce less fouling sediment may result in a frequency of changes or cleaning of filters and strainers that is less than when initially operating the ebullated bed reactor at any given sediment production rate and/or concentration.

In addition, or alternatively, the rate of equipment fouling when operating of the upgraded ebullated bed reactor using the dual catalyst system to produce less fouling sediment may result in a frequency of switches to spare heat exchangers that is less than when initially operating the ebullated bed reactor at a given sediment production rate and/or concentration.

In addition, or alternatively, the rate of equipment fouling when operating of the upgraded ebullated bed reactor using the dual catalyst system to produce less fouling sediment may result in a reduced rate of decreasing skin temperatures in equipment selected from one or more of heat exchangers, separators, or distillation towers than when initially operating the ebullated bed reactor at a given sediment production rate and/or concentration.

In addition, or alternatively, the rate of equipment fouling when operating of the upgraded ebullated bed reactor using the dual catalyst system to produce less fouling sediment may result in a reduced rate of increasing furnace tube metal temperatures than when initially operating the ebullated bed reactor at a given sediment production rate and/or concentration.

In addition, or alternatively, the rate of equipment fouling when operating of the upgraded ebullated bed reactor using the dual catalyst system to produce less fouling sediment may result in a reduced rate of increasing calculated fouling resistance factors for heat exchangers than when initially operating the ebullated bed reactor at a given sediment production rate and/or concentration.

In some embodiments, operating the upgraded ebullated bed reactor while using the dual catalyst system to produce less fouling sediment may result in a sediment production rate and/or concentration that is equal to, less than or greater than when initially operating the ebullated bed reactor. In some embodiments, the sediment concentration can be based on a measurement of sediment in one or more of: (1) an atmospheric tower bottoms product; (2) a vacuum tower bottoms product; (3) product from a hot, low pressure separator; or (4) fuel oil product before or after addition of cutter stocks.

Figure 5:
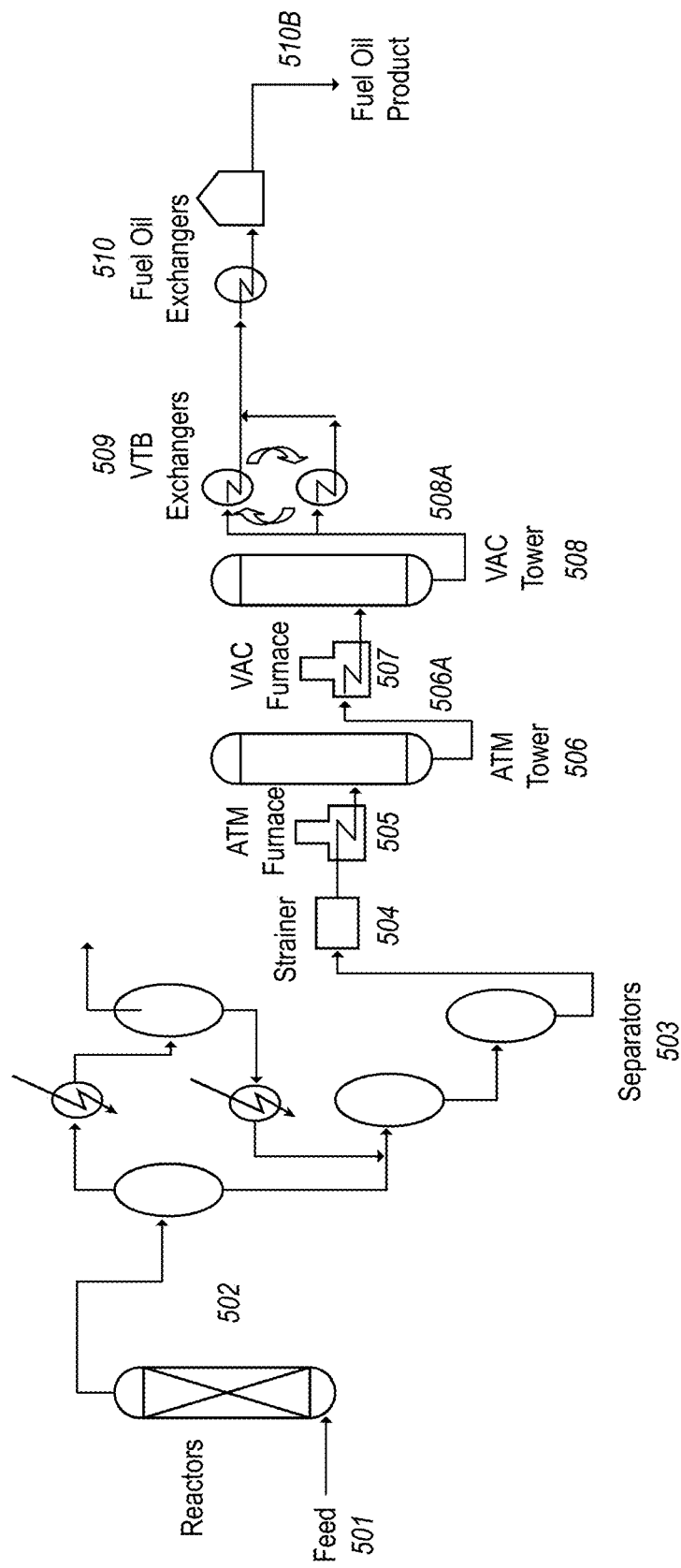
FIG. 5 is a process flow diagram showing a typical unit configuration, including the downstream equipment which is affected by process sediment and subsequent fouling.

FIG. 5 schematically illustrates an example of an upgraded ebullated bed hydroprocessing system 500 that can be used in the disclosed methods and systems to produce less fouling sediment (i.e., sediment that causes less equipment fouling at a given sediment production rate and/or concentration in a process stream). Ebullated bed hydroprocessing system 500 includes the heavy oil feed 501 introduced into an upgraded ebullated bed reactor 502 and various separators 503 used to separate gases from liquid products.

The liquid from the separators may go through a strainer or filter 504. Subsequently, the liquid may be heated by the atmospheric (ATM) furnace 505, and the liquid is distilled in the ATM tower where the lighter products are recovered from undistilled materials, or atmospheric tower bottoms (ATB). The atmospheric tower bottoms (ATB) 506A are directed to the vacuum (VAC) furnace 507 where the liquid bottoms are heated and sent to the VAC Tower 508, where additional gas oil products are recovered from undistilled materials, or vacuum tower bottoms (VTB).

The vacuum tower bottoms (VTB) 508A are sent through a series of heat exchangers 509 to cool the VTB product. Additional materials may be blended into the VTB product and that mixture can be cooled further in heat exchangers 510 to generate a fuel oil product 510B meeting various fuel oil specifications.

The separators, strainer, furnaces, towers, and heat exchangers are typical processing equipment where the downstream fouling may occur as the result of sediment in the liquid product emanating from the reactors. The sediment content is typically measured in the ATB 506A or the VTB 508A, but can also be measured in the separator liquids.

V. Experimental Studies and Results

The following test studies demonstrate the effects and advantages of upgrading an ebullated bed reactor to operate at modified conditions using a dual catalyst system comprised of a heterogeneous catalyst and dispersed metal sulfide catalyst particles when hydroprocessing heavy oil. The comparative studies were carried out using a commercial ebullated bed unit and demonstrated that using the dual catalyst system in the upgraded ebullated bed hydroprocessing system produced less fouling sediment (i.e., sediment that resulted in a reduced the rate of equipment fouling at a given sediment production rate and/or concentration compared to when sediment produced at initial conditions and prior to upgrading the ebullated bed reactor). The unit used for the examples was a three-stage ebullated bed unit. Due to the proprietary nature of the commercial unit operation, operating parameters are provided in relative rather than absolute terms.

A heavy vacuum gas oil can be used as a hydrocarbon diluent to disperse a catalyst precursor and form a catalyst precursor mixture, which is then added to and blended with the heavy oil feedstock to form a conditioned feedstock. Mixing an amount of catalyst precursor with an amount of hydrocarbon diluent forms an amount of a catalyst precursor mixture, which can then be mixed with a heavy oil feedstock to achieve a target loading of dispersed catalyst in the conditioned feedstock. By way of illustration, where the target loading of 30 ppm dispersed metal sulfide catalyst in the conditioned feedstock is desired (where the loading is expressed based on metal concentration), a catalyst precursor mixture can be prepared with 3000 ppm concentration of metal. A high shear mixing vessel is used for blending a precursor mixture comprised of a hydrocarbon diluent and catalyst precursor (e.g., molybdenum 2-ethylhexanoate) with a heavy oil feedstock to form a conditioned feedstock. Proper blending can be achieved by first pre-blending the catalyst precursor with a hydrocarbon diluent to form a precursor mixture.

The following examples were performed in a commercial ebullated bed unit. The unit used for the examples was a three-stage ebullated bed unit. Due to the proprietary nature of the commercial unit operation, operating parameters are provided in relative terms.

Comparative Example 1

The commercial ebullated bed unit for Comparative Example 1 was operated at baseline conditions, without the use of a dispersed catalyst additive to form dispersed metal sulfide catalyst particles of the dual catalyst system. Only the commercial heterogeneous supported ebullated bed catalyst in standard amount was used to process the heavy oil feed. The ebullated bed reactors were operated at a baseline temperature, with all three reactor stages operating at the same weighted average bed temperature (WABT). The process feed was Urals vacuum residue, based on a 538° C. (1000° F.) vacuum cut point, and the unit was operated at a base feed rate, commonly expressed as a liquid hourly space velocity (LHSV), which is defined as the volumetric feed rate divided by the thermal reactor volume.

Under the abovementioned base conditions, a base level of resid conversion was reached, where conversion is defined based on the 538° C.+ vacuum residue fraction. After exiting the reactor system, the converted reactor effluent was processed through a series of separations, which included atmospheric distillation and vacuum distillation, resulting in the recovery of a vacuum tower bottoms (VTB) product. A baseline sediment concentration was measured in this VTB product using the IP-375 method.

During operation of the commercial unit under the baseline condition of Comparative Example 1, multiple heat exchangers located downstream of the ebullated bed reactor section were monitored for signs of fouling. These included three sequential heat exchangers located downstream of the vacuum distillation tower that are used to reduce the temperature of the vacuum tower bottoms product. For purposes of these examples, these are designated as VTB Cooler #1, VTB Cooler #2, and VTB Cooler #3. The system also included a heat exchanger that is designed to cool an auxiliary cut, designated as Auxiliary Cut Cooler, and a heat exchanger, which reduces the temperature of the atmospheric tower bottoms, designated as the ATB Cooler. The "auxiliary cut" is a product stream obtained from above the VTB product in the vacuum distillation tower. Fouling was measured based on the differential pressure across each of these exchangers, measured in pressure units of kPa. The fouling rate is expressed as an average daily rate of increase of the differential pressure over a multi-day period, expressed in kPa/day.

Fouling results are shown below after Example 2 in Table 1. All five of the heat exchangers being monitored showed appreciable rates of fouling, ranging from 37 kPa/day for the Auxiliary Cut Cooler to 196 kPa/day for the ATB Cooler. Fouling rates for the three VTB coolers ranged from 45 to 124 kPa/day. These rates are significant and indicate a rate of heat exchanger fouling that is sufficient to require regular shutdowns of the individual heat exchangers for cleaning. To accommodate this need, the commercial unit was equipped with parallel heat exchangers, which allow key exchangers to be cleaned without shutting down the unit operation.

Example 2

In Example 2, the same commercial unit was used as described in Comparative Example 1. However, the unit was upgraded to operate at modified conditions of reactor severity while using a dual catalyst system comprising the commercial heterogeneous supported ebullated bed catalyst in the same amount together with dispersed metal sulfide catalyst particles formed using a catalyst precursor mixture comprising a hydrocarbon diluent (e.g., gas oil) and a well-dispersed catalyst precursor. The catalyst precursor mixture with well-dispersed catalyst precursor was added to the process feed at an amount sufficient to provide 35 ppm by weight of molybdenum catalyst metal based on the amount of vacuum residue feedstock. The feed rate of Ural vacuum residue feedstock was maintained at the same baseline rate used in Comparative Example 1.

In Example 2, the reactor temperature, expressed as the weighted average bed temperature ("WABT"), was increased by 9° C. compared to the baseline reactor temperature used in Comparative Example 1, and conversion based on a cut point of 538° C. was increased by 9.4% compared to the baseline conversion in Comparative Example 1. All three reactor stages were increased in temperature by the same amount and therefore continued to be operated at equal WABT across the three reactors. This increase in temperature, coupled with maintaining the same throughput, resulted in an increase in resid conversion of 9.4 percentage points compared to the baseline conversion in Comparative Example 1. This would ordinarily be expected to result in a significant increase in sediment concentration in the vacuum tower bottoms product with a corresponding increase in equipment fouling. However, because of the effect of the selected reactor conditions when using the dual catalyst system used in Example 2, the measured sediment concentration (using the IP-375 method) in the vacuum tower bottoms was 0.95 times the base concentration of Comparative Example 1, or nearly the same sediment concentration but marginally reduced by 5%.

One skilled in the art would expect that with a sediment concentration that is nearly the same as in Comparative Example 1, and only marginally reduced by 5%, the process utilized in Example 2 would be expected to show similar or only marginally reduced rates of heat exchanger fouling (e.g., of about 5%). However, the actual reductions in fouling rates observed for Example 2 were substantially greater than expected in comparison to the fouling rates in Comparative Example 1.

As shown in Table 1, the fouling rates for the VTB coolers ranged from 0.1 kPa/day for VTB Cooler #1 to 41 kPa/day for VTB Cooler #3. These correspond to reductions in the rate of fouling by an incredible 99.9% for VTB Cooler #1, 71.1% for VTB Cooler #2, and 66.9% for VTB Cooler #3. Similarly, the fouling rates for the Auxiliary Cut Cooler and the ATB Cooler were substantially lower than in Comparative Example 1, with reductions of 97.3% and 93.4%, respectively.

The observation of drastically reduced fouling rate at nearly identical (or marginally reduced) concentration of measured IP-375 sediment in the vacuum tower bottoms product indicates that the composition of the sediment is significantly changed by the effect of the modified reactor conditions in combination with adding a dispersed catalyst additive to augment the heterogeneous catalyst according to the present invention, and that sediment with greatly reduced fouling tendency was produced. "VTB" means vacuum tower bottoms, and "ATB" means atmospheric tower bottoms.

TABLE 1

|  | Comparative Example 1 | Example 2 |
|---|---|---|
|  | No Dispersed Catalyst | Dispersed Catalyst (35 ppm Mo in Vacuum Residue Feed) |
| Weighted Average Bed Temperature (° C.) | Base | Base + 9° C. |
| Resid Conversion, W % based on 538° C. Cut Point | Base | Base + 9.4% |
| IP-375 Sediment in Vacuum Tower Bottoms, Relative | Base | 0.95 * Base |

|  | Heat Exchanger Fouling Rate (Rate of Differential Pressure Increase) kPa/day | | % Reduction in Fouling Rate |
|---|---|---|---|
| VTB Cooler #1 | +90 | +0.1 | 99.9% |
| VTB Cooler #2 | +45 | +13 | 71.1% |
| VTB Cooler #3 | +124 | +41 | 66.9% |
| Auxiliary Cut Cooler | +37 | +1 | 97.3% |
| ATB Cooler | +196 | +13 | 93.4% |

Table 1 demonstrates the percent reduction in fouling for each of VTB Cooler #1, VTB Cooler #2, VTB Cooler #3, Auxiliary Cut Cooler, and ATB Cooler when upgrading the ebullated bed reactor by switching to a dual catalyst system using 35 ppm molybdenum catalyst in the vacuum residue feed, increasing temperature by 9° C., and increasing resid conversion by 9.4 wt %. While upgrading the ebullated bed reactor resulted in a minor percent reduction (i.e., 5%) in sediment concentration in the vacuum tower bottoms, the percent reduction in equipment fouling was substantially greater, ranging from 66.9% in VTB Cooler #3 to 99.9% in VTB Cooler #1.

Table 2 shows the ratio of the percent reductions in equipment fouling to sediment reduction.

TABLE 2

| Equipment | % Reduction in Fouling | % Reduction of Sediment | Ratio of % Reduction |
|---|---|---|---|
| VTB Cooler #1 | 99.9% | 5% | 19.98 |
| VTB Cooler #2 | 71.1% | 5% | 14.22 |

TABLE 2-continued

| Equipment | % Reduction in Fouling | % Reduction of Sediment | Ratio of % Reduction |
|---|---|---|---|
| VTB Cooler #3 | 66.9% | 5% | 13.38 |
| Auxiliary Cut Cooler | 97.3% | 5% | 19.46 |
| ATB | 93.4% | 5% | 18.68 |

As shown in Table 2, at the high end, the reduction in fouling of the VTB Cooler #1 in Example 2 was about 20 times higher than the reduction in sediment concentration. At the low end, the reduction in fouling of VTB Cooler #3 in Example 2 was still about 13.4 times the reduction in sediment concentration. Thus, the rate of equipment fouling was reduced by multiples ranging from about 13.4 to about 20 times the reduction in sediment concentration when upgrading the ebullated bed hydroprocessing system of Comparative Example 1 according to the invention to yield the upgraded ebullated bed hydroprocessing system of Example 2. This roughly correlates with the sediment produced in Example 2 being about 13.4 to 20 times less fouling than the sediment produced in Comparative Example 1.

Example 3

In another comparison, upgrading an ebullated bed reactor according to the invention resulted in a reduction in sediment concentration in the vacuum tower bottoms of from 0.39 wt % to 0.30 wt %. However, the cycle length between equipment cleanouts in VTB Cooler #1 was increased from 10 days to over 35 days, or a decrease in fouling rate of over 3.5 times. Using a similar comparison as in Table 2 above, the ratio in the percent reduction in equipment fouling (greater than 71%) to reduction in sediment concentration (23%) was greater than 3.1. This roughly correlates with the sediment produced in Example 3 being more than 3.1 times less fouling than the baseline sediment produced prior to upgrading the ebullated bed reactor according to the invention to produce less fouling sediment.

The present invention may be embodied in other specific forms without departing from its spirit or essential characteristics. The described embodiments are to be considered in all respects only as illustrative and not restrictive. The scope of the invention is, therefore, indicated by the appended

The invention claimed is:

1. A method of upgrading an ebullated bed hydroprocessing system that includes one or more ebullated bed reactors to produce sediment that is less fouling, comprising:
    operating an ebullated bed reactor using a heterogeneous catalyst to hydroprocess heavy oil at initial conditions to yield an initial process stream containing converted products and sediment, including hydroprocessing heavy oil at initial production rate of converted products, initial sediment production rate and/or initial sediment concentration in the initial process stream, and initial rate of equipment fouling;
    thereafter upgrading the ebullated bed reactor to operate using a dual catalyst system comprised of dispersed metal sulfide catalyst particles and heterogeneous catalyst; and
    operating the upgraded ebullated bed reactor using the dual catalyst system to hydroprocess heavy oil and produce a modified process stream that contains sediment that is less fouling than the sediment in the initial process stream, resulting in at least 5% less equipment fouling at a given sediment production rate and/or concentration compared to when operating the ebullated bed reactor at the initial conditions.

2. The method of claim 1, wherein operating the upgraded ebullated bed reactor comprises increasing the rate of production of converted products compared to the initial production rate of converted products by:
    increasing the temperature by at least 2.5° C. and increasing the conversion by at least 2.5% while maintaining the same or similar throughput than when operating the ebullated bed reactor at the initial conditions;
    increasing the temperature by at least 2.5° C. and increasing the throughput by at least 2.5% while maintaining the same or similar conversion than when operating the ebullated bed reactor at the initial conditions; or
    increasing the temperature by at least 2.5° C., increasing the throughput by at least 2.5%, and increasing the conversion by at least 2.5% than when operating the ebullated bed reactor at the initial conditions.

3. The method of claim 1, wherein the rate of equipment fouling is determined, when operating ebullated bed reactor at the initial conditions and when operating the upgraded ebullated bed reactor, by at least one of:
    (i) frequency of required heat exchanger clean-outs;
    (ii) frequency of switching to spare heat exchangers;
    (iii) frequency of filter changes;
    (iv) frequency of strainer clean-outs or changes;
    (v) rate of decrease in equipment skin temperatures, including in equipment selected from heat exchangers, separators, or distillation towers;
    (vi) rate of increase in furnace tube metal temperatures;
    (vii) rate of increase in calculated fouling resistance factors for heat exchangers and furnaces;
    (viii) rate of increase in differential pressure of heat exchangers;
    (ix) frequency of cleaning atmospheric and/or vacuum distillation towers; or
    (x) frequency of maintenance turnarounds.

4. The method of claim 1, wherein operating the upgraded ebullated bed reactor comprises:
    operating the upgraded ebullated bed reactor at the same or similar reactor severity as the initial reactor severity and producing converted products at a same or similar rate as the initial production rate of converted products when operating the ebullated bed reactor at the initial conditions;
    producing sediment at a reduced rate and/or concentration compared to the initial sediment production rate and/or concentration when operating the ebullated bed reactor at the initial conditions; and
    equipment fouling of the hydroprocessing system occurring at a reduced rate compared to the initial rate of equipment fouling when operating the ebullated bed reactor at the initial conditions, characterized by the rate of equipment fouling being reduced by a greater degree than the reduction in sediment production rate and/or concentration.

5. The method of claim 1, wherein operating the upgraded ebullated bed reactor comprises:
    operating the upgraded ebullated bed reactor at higher reactor severity than the initial reactor severity and producing converted products at a higher rate than the initial production rate of converted products when operating the ebullated bed reactor at the initial conditions;
    producing sediment at a rate and/or concentration that is the same as or similar to the initial sediment production rate and/or concentration when operating the ebullated bed reactor at the initial conditions; and
    equipment fouling of the hydroprocessing system occurring at a reduced rate compared to the initial rate of equipment fouling when operating the ebullated bed reactor at the initial conditions.

6. The method of claim 1, wherein operating the upgraded ebullated bed reactor comprises:
    operating the upgraded ebullated bed reactor at higher reactor severity than the initial reactor severity and producing converted products at a higher rate than an initial production rate of converted products when operating the ebullated bed reactor at the initial conditions;
    producing sediment at a higher rate and/or concentration than the initial sediment production rate and/or concentration when operating at the initial conditions; and
    equipment fouling occurring at a rate that is no higher than the initial rate of equipment fouling when operating at the initial conditions.

7. The method of claim 2, wherein operating the upgraded ebullated bed reactor comprises at least two of:
    increasing the throughput by at least 5%, at least 10%, or at least 20%, than when operating the ebullated bed reactor at the initial conditions;
    increasing the conversion by at least at least 5%, at least 7.5%, at least 10%, or at least 15%, than when operating the ebullated bed reactor at the initial conditions; or
    increasing the temperature by at least 5° C., at least 7.5° C., or at least 10° C., than when operating the ebullated bed reactor at the initial conditions.

8. The method of claim 1, wherein the rate of equipment fouling when operating the upgraded hydroprocessing system is reduced by at least 25%, at least 50%, or at least 75%, than when operating the ebullated bed reactor at the initial conditions.

9. The method of claim 1, wherein sediment production is determined, when operating the ebullated bed reactor at the initial conditions and when operating the upgraded ebullated bed reactor using the dual catalyst system, by at least one of:

(i) absolute sediment production rate; or
(ii) sediment concentration in at least one process stream of the ebullated bed hydroprocessing system.

10. The method of claim 9, wherein the sediment concentration is measured in at least one process stream selected from atmospheric residue, atmospheric distillation tower bottoms, vacuum residue, vacuum distillation tower bottoms, atmospheric tower feed, hot low pressure separator product, fuel oil product, vacuum tower bottoms after addition of cutter stocks.

11. The method of claim 1, wherein, after upgrading the ebullated bed reactor to produce sediment that is less fouling, the sediment production rate and/or concentration is maintained or increased compared to the initial sediment production rate and/or concentration, the less fouling sediment produced by the upgraded the ebullated bed reactor reducing the rate of equipment fouling by at least 5%, 25%, 50%, or 75% compared to the initial rate of equipment fouling caused by the sediment in the initial process stream.

12. The method of claim 1, wherein, after upgrading the ebullated bed reactor to produce sediment that is less fouling, the sediment production rate is increased by at least 2%, 10%, 20%, or 33% compared to the initial sediment production rate, the less fouling sediment produced by the upgraded the ebullated bed reactor maintaining or reducing the rate of equipment fouling compared to the initial rate of equipment fouling caused by the sediment in the initial process stream.

13. The method of claim 1, wherein, after upgrading the ebullated bed reactor to produce sediment that is less fouling, the sediment concentration in the process stream is increased by at least 2%, 10%, 20%, or 33% compared to the initial sediment concentration, the less fouling sediment produced by the upgraded the ebullated bed reactor maintaining or reducing the rate of equipment fouling compared to the initial rate of equipment fouling caused by the sediment in the initial process stream.

14. The method of claim 1, wherein, after upgrading the ebullated bed reactor to produce sediment that is less fouling, the sediment production rate is reduced by at least 2%, 10%, 30%, or 50% compared to the initial sediment production rate, the less fouling sediment produced by the upgraded the ebullated bed reactor reducing the rate of equipment fouling compared to the initial rate of equipment fouling by an even greater percentage than the percent reduction in the sediment production rate.

15. The method of claim 1, wherein, after upgrading the ebullated bed reactor to produce sediment that is less fouling, the sediment concentration in the process stream is reduced by at least 2%, 10%, 30%, or 50% compared to the initial sediment concentration in the initial process stream, the less fouling sediment produced by the upgraded the ebullated bed reactor reducing the rate of equipment fouling compared to the initial rate of equipment fouling by an even greater percentage than the percent reduction in the sediment concentration.

16. The method of claim 15, wherein the decrease in equipment fouling is about 3 times to about 20 times greater than the decrease in sediment quantity.

17. The method of claim 1, wherein the heavy oil comprises at least one of heavy crude oil, oil sands bitumen, residuum from refinery processes, visbreaker bottoms, atmospheric tower bottoms having a nominal boiling point of at least 343° C. (650° F.), vacuum tower bottoms having a nominal boiling point of at least 524° C. (975° F.), resid from a hot separator, resid pitch, resid from solvent extraction, or vacuum residue.

18. The method of claim 1, wherein the dispersed metal sulfide catalyst particles are less than 1 μm in size, or less than about 500 nm in size, or less than about 250 nm in size, or less than about 100 nm in size, or less than about 50 nm in size, or less than about 25 nm in size, or less than about 10 nm in size.

19. The method of claim 1, wherein upgrading the ebullated bed reactor to operate using a dual catalyst system comprises forming the dispersed metal sulfide catalyst particles in situ within the heavy oil from a catalyst precursor.

20. The method of claim 19, wherein forming the dispersed metal sulfide catalyst particles in situ within the heavy oil comprises mixing the catalyst precursor with a diluent hydrocarbon to form a diluted precursor mixture, blending the diluted precursor mixture with the heavy oil to form conditioned heavy oil, and heating the conditioned heavy oil to decompose the catalyst precursor and form the dispersed metal sulfide catalyst particles in situ within the heavy oil.

21. A method of upgrading an ebullated bed hydroprocessing system that includes one or more ebullated bed reactors to produce sediment that is less fouling, comprising:
operating an ebullated bed reactor using a heterogeneous catalyst to hydroprocess heavy oil at initial conditions to yield an initial process stream containing converted products and sediment, including hydroprocessing heavy oil at initial production rate of converted products, initial sediment production rate and/or initial sediment concentration in the initial process stream, and initial rate of equipment fouling;
thereafter upgrading the ebullated bed reactor to operate using a dual catalyst system comprised of dispersed metal sulfide catalyst particles and heterogeneous catalyst; and
operating the upgraded ebullated bed reactor using the dual catalyst system to hydroprocess heavy oil and produce a modified process stream that contains sediment that is less fouling than the sediment in the initial process stream, the upgraded ebullated bed reactor being operated at conditions that reduce the sediment production rate and/or sediment concentration by a percent reduction compared to the initial sediment production rate and/or initial sediment concentration,
the less fouling sediment causing a percent reduction in the rate of equipment fouling compared to the initial rate of equipment fouling that is at least 5% greater than the percent reduction in sediment production rate and/or sediment concentration.

22. The method of claim 21, wherein, after upgrading the ebullated bed reactor to produce sediment that is less fouling, the sediment production rate is reduced by at least 2%, 10%, 30%, or 50% compared to the initial sediment production rate, the less fouling sediment produced by the upgraded the ebullated bed reactor reducing the rate of equipment fouling compared to the initial rate of equipment fouling by an even greater percentage than the percent reduction in the sediment production rate.

23. The method of claim 21, wherein, after upgrading the ebullated bed reactor to produce sediment that is less fouling, the sediment concentration in the process stream is reduced by at least 2%, 10%, 30%, or 50% compared to the initial sediment concentration in the initial process stream, the less fouling sediment produced by the upgraded the ebullated bed reactor reducing the rate of equipment fouling compared to the initial rate of equipment fouling by an even greater percentage than the percent reduction in the sediment concentration.

24. A method of upgrading an ebullated bed hydroprocessing system that includes one or more ebullated bed reactors to produce sediment that is less fouling, comprising:
operating an ebullated bed reactor using a heterogeneous catalyst to hydroprocess heavy oil at initial conditions to yield an initial process stream containing converted products and sediment, including hydroprocessing heavy oil at initial production rate of converted products, initial sediment production rate and/or initial sediment concentration in the initial process stream, and initial rate of equipment fouling;
thereafter upgrading the ebullated bed reactor to operate using a dual catalyst system comprised of dispersed metal sulfide catalyst particles and heterogeneous catalyst; and
operating the upgraded ebullated bed reactor using the dual catalyst system to hydroprocess heavy oil and produce a modified process stream that contains sediment that is less fouling than the sediment in the initial process stream, the upgraded ebullated bed reactor being operated at conditions that maintain the same or similar sediment production rate and/or sediment concentration as the initial sediment production rate and/or initial sediment concentration,
the less fouling sediment produced by the upgraded ebullated bed reactor causing a reduction in the rate of equipment fouling of at least 5% compared to the initial rate of equipment fouling when operating the ebullated bed reactor at the initial conditions.

25. The method of claim 24, wherein the less fouling sediment produced by the upgraded ebullated bed reactor causes a reduction in the rate of equipment fouling of at least 25%, 50%, or 75% compared to the initial rate of equipment fouling when operating the ebullated bed reactor at the initial conditions.

* * * * *